United States Patent [19]

Aihara et al.

[11] Patent Number: 5,633,106
[45] Date of Patent: May 27, 1997

[54] OPTICAL RECORDING MEDIA AND A METHOD OF RECORDING AND REPRODUCING INFORMATION

[75] Inventors: Shin Aihara; Hideki Umehara, both of Yokohama; Masatoshi Yanagimachi, Funabashi; Yoshiteru Taniguchi; Sumio Hirose, both of Yokohama, all of Japan

[73] Assignee: Mitsui Toatsu Chemicals, Inc., Tokyo, Japan

[21] Appl. No.: 416,365

[22] Filed: Apr. 4, 1995

[30] Foreign Application Priority Data

| Apr. 8, 1994 | [JP] | Japan | 6-070346 |
| May 13, 1994 | [JP] | Japan | 6-100035 |
| Nov. 24, 1994 | [JP] | Japan | 6-289705 |

[51] Int. Cl.$^6$ ............... G11B 7/24; G11B 7/00
[52] U.S. Cl. ............ 430/21; 430/270.15; 430/270.16; 430/270.2; 430/270.21; 430/945
[58] Field of Search .......... 430/270.15, 270.16, 430/270.2, 270.21, 945, 271.1, 273.1, 21; 369/284, 288

[56] References Cited

U.S. PATENT DOCUMENTS

| 4,460,665 | 7/1984 | Kunikane et al. | 428/199 |
| 5,079,135 | 1/1992 | Matsuzawa et al. | 430/495 |
| 5,090,009 | 2/1992 | Hamada et al. | 369/284 |
| 5,124,067 | 6/1992 | Itoh et al. | 252/299.2 |
| 5,244,774 | 9/1993 | Usami et al. | 430/271 |
| 5,270,150 | 12/1993 | Oishi et al. | 430/271 |

FOREIGN PATENT DOCUMENTS

| 019329 | 11/1980 | European Pat. Off. . |
| 353393 | 2/1990 | European Pat. Off. . |
| 418611 | 3/1991 | European Pat. Off. . |
| 455124 | 11/1991 | European Pat. Off. . |
| 463550 | 1/1992 | European Pat. Off. . |
| 3-281287 | 12/1991 | Japan . |
| 3-290835 | 12/1991 | Japan . |
| 6-40162 | 2/1994 | Japan . |
| 6-336086 | 12/1994 | Japan . |

OTHER PUBLICATIONS

Patent Abstracts Of Japan, vol. 14, No. 353 (P–1086), Jul. 1990–JP–A–02128331 (Abstract).
Patent Abstracts Of Japan, vol. 18, No. 259, (M–1607), May 1994–JP–A–06040162 (Abstract).
Emiko Hamada et al, Optical Data Storage 1989 Technical Digest Series, *That's CD–R*, vol. 1, pp. 45–47, 1989.

*Primary Examiner*—John A. McPherson
*Attorney, Agent, or Firm*—Burns, Doane, Swecker & Mathis

[57] ABSTRACT

There is provided with an optical recording medium comprising at least a dye-containing recording layer and a reflective layer laminated on a transparent substrate in this order which has a reflectance of 65% or higher, measured through the substrate, to a light beam having a selected wavelength ($\lambda 1$) of from 770 to 830 nm and has a reflectance of 15% or higher to a light beam having a selected wavelength ($\lambda 2$) of from 630 to 690 nm and which is recordable and reproducible with a laser beam having the wavelength of $\lambda 1$ and being reproducible with a laser beam having the wavelength of $\lambda 2$. In addition, the recording layer has a dye A having the absorption maximum at the wavelength shorter than 630 nm mixed with a dye B having the absorption maximum at the wavelength of from 630 to 900 nm. Alternatively, an interference layer is provided along with the recording and reflective layers. The recording layer is based on a phthalocyanine dye while the interference layer is based on an inorganic dielectric, a polymer, or an azo dye. The requirements for the interference layer are also provided.

18 Claims, No Drawings

OPTICAL RECORDING MEDIA AND A METHOD OF RECORDING AND REPRODUCING INFORMATION

BACKGROUND OF THE INVENTION

1. Field of the Invention

The present invention relates to an optical recording medium having at least a dye-containing recording layer and a reflective layer formed on a transparent substrate. More particularly, the present invention relates to an optical recording medium which satisfies the Orange Book Standards for compact disc-recordable (hereinafter, referred to as CD-R), allowing recording and reproduction of information by using a laser beam having a selected wavelength of from to 830 nm as well as allowing reproduction by using a laser beam having a selected wavelength of from 630 to 690 nm.

2. Description of the Related Art

Conventional single-substrate recordable optical disc, CD-Rs, are disclosed in, for example, "Optical Data Storage 1989", Technical Digest Series, Vol. 1, 45 (1989), in which the medium has a recording layer of dyes, a metal reflective layer provided on the recording layer to improve the reflectance, and a protective layer provided on the latter. The recording layer of the media may contain cyanine dyes or phthalocyanine dyes of the type used in the present invention. Such recording media are available on the market as a compact disc-recordable (CD-R).

The CD-R medium is based on the Orange Book Standards and has a reflectance of 65% or higher to a beam having a selected wavelength ($\lambda 1$) of from 770 to 830 nm while absorbing the beam having the wavelength $\lambda 1$. Information can thus be recorded on such a medium by using a semiconductor laser of 780 nm. Conveniently, the recorded information can be reproduced through a commercially available CD player or CD-ROM player provided with a semiconductor laser of 780 nm.

On the other hand, optical recording media currently available have a recording capacity of only 650 MB. A recording time is thus 15 minutes at maximum for recording a large volume of information such as dynamic digital images. In the recent trend of downsizing equipment, conventional recording density cannot provide a sufficient memory capacity as the medium becomes small.

Quite recently, a semiconductor laser having a wavelength ($\lambda 2$) selected from 630 to 690 nm has been developed. This semiconductor laser is making it possible to achieve high-density recording and/or reproduction. It has been studied to develop, with this semiconductor laser, a high-density recording medium having 5–8 times the recording capacity of conventional media and to develop a CD player for such high-density recording media which is capable of reproducing information thereon. In particular, there have been studied systems capable of recording a movie of 2 hours or more in digital format. Read-only media and reproduction players for such systems are to be introduced into the market as digital video discs (DVDs).

As one of this high-density recording media, there is a read-only medium having an aluminum reflective layer deposited on the pits formed in producing the substrate, as in the conventional CD and CD-ROM media. This read-only high-density recording medium has a reflectance of 70% or higher. It is thus necessary that a player capable of reproducing such high-density recording media is designed to have a capability of reproducing information on the read-only medium having the reflectance of 70% or higher. As a matter of course, this high-density player is desired to be able to read conventional media such as CDs, CD-ROMs, and CD-Rs.

Conventional CD and CD-ROM media are for read-only purpose, and the process of manufacturing them is the same as that for the above mentioned high-density read-only media. These media have a reflectance of 70% or higher and are thus applicable to the high-density player for reproduction.

On the other hand, the conventional CD-R media currently available in the market have a reflectance of 65% or higher to the light beam having a wavelength of about 780 nm and are applicable to a commercially available CD or CD-ROM player. However, these media have a reflectance of 10% or smaller when subjected to reproduction with a light beam having a wavelength ($\lambda 2$) selected from the range of 630–690 nm. The degree of modulation is small and the reflectance of a recorded portion becomes larger than that of an unrecorded portion. This phenomenon is known as "low to high recording", in which the polarity is reversed from common CDs (high to low recording). In addition, a resultant reproduced signals have a large deformation. Due to these various disadvantages, it is difficult to play the conventional CD-R media by using a player for high-density media with a laser beam having the wavelength ($\lambda 2$) selected from the range between 630 and 690 nm.

For example, U.S. Pat. No. 5,090,009 discloses a CD-R medium comprising a dye-containing recording layer, a reflective layer, and a protective layer laminated on a substrate in this order. This patent also discloses a medium having an interference layer provided between the substrate and the recording layer or between the recording layer and the reflective layer. In addition, it discloses optical constants as well as a film thickness of the recording layer to satisfy the CD standards (Red Book) and to enable recording. The media disclosed certainly absorb a portion of the light beam of 780 nm which is used for CDs. In addition, the reflectance of the media can be 70% or higher. The CDs are thus recordable and reproducible with the light beam of this wavelength. The '009 patent is, however, not directed to recording and reproduction with the light beam having the wavelength ($\lambda 2$) selected from the range between 630 and 690 nm. In addition, there is no disclosure about the reflectance to the light beam having that wavelength, the optical constants of the recording layer, and an optical path length of the interference layer. The '009 patent discloses various examples of the media having a recording layer of an indodicarbocyanine dye, of which some media have an interference layer made of an inorganic compound or a polymer, and others not. However, the media with the recording layer of the indodicarbocyanine dye have the reflectance of 10% or lower to the light beam having the wavelength selected from the range between 630 and 690 nm. The recording is the low to high recording, in which the reflectance of the recorded portion is larger than that of the unrecorded portion. The reasons of this small reflectance are as follows: the optical characteristics of the dye used is highly dependent on the wavelengths. The above mentioned indodicarbocyanine dye has a significantly large absorption at from 600 to 750 nm when measured on the recording layer; and the CD-R medium has the optical constants (refractive index which is the value of the real part of the complex refractive index, and attenuation coefficient which is the absolute value of the imaginary part of the complex refractive index) and the film thickness designed to achieve a high reflectance to the light beam of around 780 nm. This means that the reflectance is small at the wavelengths within the range between 630 and 690 nm. In addition, the Examples 8 and 14 of this patent disclose media having a recording layer of t-butyl substituted phthalocyanine dye, which is different from phthalocyanine dye used as the recording layer of the present invention, and an interference layer made of a polymer or an inorganic compound. Though the reflectance and the degree of modulation of these media satisfy the CD standards, a reproduced waveform has a large deformation when the signal recorded by pulse width modulation as in CDs is reproduced with the light beam having the wavelength ($\lambda 2$) selected from the range between 630 and 690 nm. The error rate and the jitter value become large, and the media thus cannot be played back by a player for the high-density.

European Patent Laid-Open No. 0 019 329 discloses a medium having a recording layer of VO-phthalocyanine dye, on which an interference layer of cellulose (300 nm) is applied. The application is, however, directed to improve the reflectance and the recording sensitivity to a specific single wavelength. The recording layer is not optimized to permit recording and reproduction with two light beams having the wavelength ($\lambda 1$) selected from the range between 770 and 830 nm and the wavelength ($\lambda 2$) selected from the range between 630 and 690 nm, respectively. For this medium, a reproduced waveform has a large deformation when the signal recorded by pulse width modulation as in CDs is reproduced with the light beam having the wavelength ($\lambda 2$) selected from the range between 630 and 690 nm. The error rate and the jitter value become large, and the media thus cannot be played back by a player for the high-density.

U.S. Pat. No. 5,124,067 discloses dyes similar to those used in the recording layer of the present invention. The patent also discloses several media using such dyes. Though satisfying the CD standards, the media disclosed in Examples 98, 100, and 102 of the patent provide a recording mode of low-to-high when reproduced with the light beam having the wavelength ($\lambda 2$) selected from the range between 630 and 690 nm. In addition, the reflectance is 10% or lower. Furthermore, a reproduced waveform has a large deformation when the signal recorded by pulse width modulation as in CDs is reproduced with the light beam having the wavelength ($\lambda 2$) selected from the range between 630 and 690 nm. The error rate and the jitter value become large, and the media thus cannot be played back by a player for the high-density.

Japanese Patent Laid-open No. 3–281287 discloses a medium having a recording layer of a mixture of dyes (A) and (B), in which the dye (A) has an absorption maximum of the longer wavelength at 780 nm and has such a complex refractive index that the absolute value of the imaginary part of the refractive index at 780 nm is 0.2 or smaller; and the dye (B) is a monocarbocyanine dye having an absorption maximum at a wavelength shorter than the wavelength at which the dye (A) exhibits the absorption maximum. This medium is superior in durability and satisfies the CD standards. However, it is not optimized for reproduction with the light beam having the wavelength ($\lambda 2$) selected from the range between 630 and 690 nm. As apparent from the examples, the rate of the monocarbocyanine dye used is 50 wt.% and the rate of the dicarbocyanine dye used is also 50 wt. %. The resultant medium thus has an excessively large absorption to the light beam having the wavelength ($\lambda 2$) selected from the range between 630 and 690 nm. As a result, the reflectance becomes lower than 15%, and it is thus difficult to reproduce the recorded information by using a player for the high-density.

Japanese Patent Laid-open No. 6–336086 discloses a medium having a recording layer of a mixture of a monocarbocyanine dye and a dicarbocyanine dye both of which have a specific structure. This medium is directed to recording and reproduction with the light beams having the wavelength of 780 nm and 488 nm. A ratio of the monocarbocyanine dye and the dicarbocyanine dye is 1:10. With the larger rate of the pentamethine cyanine dye used, the resultant recording layer has an excessively larger absorption to the light beam having the wavelength ($\lambda 2$) selected from the range between 630 and 690 nm. As a result, the reflectance becomes lower than 15%, and it is thus difficult to reproduce the recorded information by using a player for the high-density.

Japanese Patent Laid-open No. 6–40162 discloses a medium having a recording layer of a monocarbocyanine dye. This medium is directed to recording and reproduction with the light beam having the wavelength of 630 nm. The recording layer has no absorption to the light beam having the wavelength of 780 nm, so that the recording cannot be achieved With the light of this wavelength.

Japanese Patent Laid-open No. 3–290835 discloses a medium provided with an interference layer made of a low molecular weight organic compound between a recording layer and a reflective layer of an aluminum alloy. This medium uses the aluminum alloy rather than expensive gold for the reflective layer, and has an interference layer to achieve the reflectance of 70% or higher at 780nm. In this medium, the reflectance is certainly 70% or higher at 780 nm. However, the reflectance is low to the light beam having the wavelength ($\lambda 2$) selected from the range between 630 and 690 nm, and it is thus difficult to reproduce the recorded information by using a player for the high-density.

As mentioned above, there is no such an optical recording medium having at least a dye-containing recording layer and a reflective layer as has a reflectance of 65% or higher to the laser beam having the wavelength ($\lambda 1$) selected from the range between 770 and 830 nm, has high sensitivity, is superior in recording characteristics, can be played back by a commercially available CD or CD-ROM player, and as can be played back also by a player for high-density with a laser beam having the selected wavelength ($\lambda 2$) of from 630 to 690 nm.

SUMMARY OF THE INVENTION

The present inventors have made tremendous studies to develop a medium that satisfies the Orange Book Standards for CD-Rs (having a reflectance of 65% or higher to the light beam having the selected wavelength of from 770 to 830 nm and allowing recording and reproduction at that wavelength), and that can be recorded in a high-to-low recording mode without causing a deformation in a reproduced waveform when played back with the light beam having the selected wavelength of from 630 to 690 nm, and that the error rate and the jitter value are small. The present invention was thus completed.

According to the present invention, there is provided with an optical recording medium having at least a dye-containing recording layer and a reflective layer laminated on a transparent substrate in this order, the medium having a reflectance of 65% or higher, measured through the substrate, to the light beam having a selected wavelength ($\lambda 1$) of from 770 to 830 nm and having a reflectance of 15% or higher, measured through the substrate, to the light beam having a selected wavelength ($\lambda 2$) of from 630 to 690 nm, the medium thereby being recordable and reproducible with a laser beam having the wavelength of $\lambda 1$ and being reproducible with a laser beam having the wavelength of $\lambda 2$.

In addition, according to the present invention, there is also provided with a method of recording and reproducing information on and from an optical recording medium having at least a dye-containing recording layer and a reflective layer laminated on a transparent substrate in this order, the medium having a reflectance of 65% or higher, measured through the substrate, to the light beam having a selected wavelength ($\lambda 1$) of from 770 to 830 nm and having a reflectance of 15% or higher, measured through the substrate, to the light beam having a selected wavelength ($\lambda 2$) of from 630 to 690 nm, the method comprising the steps of recording and reproducing information on and from the medium with a laser beam having the wavelength of $\lambda 1$ and reproducing the information recorded at the wavelength $\lambda 1$ from the medium with a laser beam having the wavelength of $\lambda 2$.

The optical recording medium according to the present invention has a reflectance of 65% or higher, measured through the substrate, to the light beam having a selected wavelength ($\lambda 1$) of from 770 to 830 nm and has a reflectance of 15% or higher, measured through the substrate, to the light beam having a selected wavelength ($\lambda 2$) of from 630 to 690 nm. Typical CD and CD-ROM players commercially available are provided with a semiconductor laser having a wavelength around 780 nm. In addition, such players are so designed as to be applicable to media having a reflectance of 65% or higher. The recording medium of the present invention can thus be played back with a commercially available CD or CD-ROM player. On the other hand, there is no specific limitation on the reflectance of a medium reproducible with a player for high-density which is provided with a laser having a selected wavelength ($\lambda 2$) from 630 to 690 nm. However, for detection of a signal from a medium on which information is recorded by means of pulse width modulation as in CDs, it is substantially impossible to detect the signal when a reflectance is significantly low, i.e., 10% or lower. It is thus impossible to reproduce such a signal. Further, the players for high-density are designed to reproduce information from a read-only medium having a high reflectance of 70% or higher. However, a player capable of reproducing information from both a medium having a high reflectance of 70% or higher and a medium having a low reflectance can work only with the addition of a device to, for example, switch circuits depending on the reflectance due to a dynamic range of the reflectance. With respect to this, it is preferable that the reflectance to the light beam having a selected wavelength ($\lambda 2$) of from 630 to 690 nm is 15% or higher, and more preferably 20% of higher.

DETAILED DESCRIPTION OF THE INVENTION

The medium according to the present invention may be either one of the following two alternative types:

(a) a medium having a dye-containing recording layer, and a reflective layer laminated in this order on a transparent substrate; or (b) a medium having a dye-containing recording layer, an interference layer, and a reflective layer laminated in this order on a transparent substrate or having an interference layer, a dye-containing recording layer, and a reflective layer laminated in this order on the transparent substrate.

Next, each of the above mentioned two media is described more specifically.

The transparent substrate used in the medium of type (a) according to the present invention preferably has a transmittance of 85% or higher to the light used for recording and reading signals, and has a small optical anisotropy. The transparent substrate may be, for example, made of a known resin such as an acrylic resin, a polycarbonate resin, and a polyolefin resin.

The substrate may be in the form of a plate or of a film, and may be disc-shaped or card-shaped. On the surface of the substrate may be a spiral track of successive shallow depressions (pre-groove) or pits to store the digital information in the length thereof. Though the pre-groove or pits are preferably formed in producing the substrate, they may be formed in an ultraviolet-curing resin layer formed on the substrate.

In the present invention, optical characteristics of the dye-containing recording layer in the above mentioned medium (a) are important factors in respect to reflectance, recording sensitivity, and a degree of modulation. It is preferable that the following relationships hold:

$n1 \geq 1.8$,
$0.04 \leq k1 \leq 0.15$,
$n2 \geq 1.6$, and
$0.04 \leq k2 \leq 0.4$, where n1 is a value of the real part of the complex refractive index of the recording layer to a light beam having a wavelength of $\lambda 1$, k1 is an absolute value of the imaginary part of the complex refractive index of the recording layer to a light beam of $\lambda 1$, n2 is a value of the real part of the complex refractive index of the recording layer to a light beam having a wavelength of $\lambda 2$, and k2 is an absolute value of the imaginary part of the complex refractive index of the recording layer to a light beam of $\lambda 2$. The absorbance of the recording layer is preferably from 0.03 to 0.3 to the light beam of $\lambda 1$, and from 0.03 to 0.5 to the light beam of $\lambda 2$. When n1 is smaller than 1.8 or when k1 is larger than 0.15, it becomes difficult to achieve the reflectance of 65% or higher to the light beam of $\lambda 1$. On the contrary, when k1 is smaller than 0.04, the recording sensitivity to the light beam of $\lambda 1$ is deteriorated. In addition, n2 smaller than 1.6 and k2 larger than 0.4 are not preferable in that they cause the reflectance to the light beam of $\lambda 2$ to be lower than 15%. There is no limitation on the minimum value of k2. However, it is preferable that k2 is 0.04 or larger in respect to the recording sensitivity to the light beam of $\lambda 2$ because it is desirable that the light beam of k2 can be used for recording. When the recording layer has the absorbance smaller than 0.03 to the light beam of $\lambda 1$, the recording sensitivity to the light beam of $\lambda 1$ is deteriorated. On the contrary, when the absorbance thereof exceeds 0.3, the reflectance to the light beam of $\lambda 1$ becomes lower than 65%. In addition, the absorbance larger than 0.5 to the light beam of $\lambda 2$ is not preferable in that it causes the reflectance to the light beam of k2 to be smaller than 15%. Though there is no limitation on the minimum value of the absorbance to the light beam of $\lambda 2$, it is preferable that the absorbance is 0.03 or larger in respect to the recording sensitivity to the light beam of k2 because it is desirable that the light beam of $\lambda 2$ can be used for recording. There is no limitation on the dyes used for imparting the above mentioned optical characteristics to the recording layer. However, it is difficult to achieve such optical characteristics with a single kind of dye. With this respect, the present invention uses a dye A having the absorption maximum at the wavelength shorter than 630 nm mixed with a dye B having the absorption maximum at the wavelength of from 630 to 900 nm to impart the above mentioned optical characteristics to the recording layer. It is preferable that the rate of the dye A is in a range from 80 wt. % to 99.9 wt. %, both inclusive, and the rate of the dye B is in a range from 0.1 wt. % to 20 wt. %, both inclusive. The dyes A and B may be formed of two or more dyes.

Specific examples of the dyes include phthalocyanine dyes, naphthalocyanine dyes, cyanine dyes, styryl dyes, merocyanine dyes, squarylium dyes, pyrylium dyes, anthraquinone dyes, naphthoquinone dyes, benzoquinone dyes, porphyrin dyes, azo dyes, dithiol metal complex dyes, indophenol dyes, triphenylmethane dyes, xanthene dyes, indanthrene dyes, indigo dyes, oxazine dyes, thiazine dyes, acridine dyes, indoaniline dyes, and azulenium dyes. These dyes may contain a metal or metals.

Of these, tricarbocyanine, phthalocyanine, and naphthalocyanine dyes are preferable as the dye B having the absorption maximum at between 630 and 900 nm in that they have a large molar absorption coefficient of the absorption maximum. Phthalocyanine and naphthalocyanine dyes are particularly preferable in that they exhibit remarkable resistance to light and moist heat. As the dye A having the absorption maximum at the wavelength shorter than 630 nm, monocarbocyanine, porphyrin, tetraazaporphyrin, and azo dyes are preferable in that they have a large molar absorption coefficient of the absorption maximum. Of these, monocarbocyanine is particularly preferable in that it has a larger molar absorption coefficient of the absorption maximum. In addition, it is preferable that the dye having the absorption maximum at between 630 and 900 nm is compatible with the dye having the absorption maximum at the wavelength shorter than 630 nm because they can be coated with being dissolved in a solvent. The term "absorption maximum" used herein means the absorption maximum or the absorption close to the maximum one at the individual ranges. If there are two or more peaks, this term means the one having the largest wavelength. In addition, light absorption characteristics of the dyes depend on a state of association of molecules. The light absorption characteristics are also different between in a solution phase and a solid phase (film), and depend on concentrations. The absorption maximum wavelength in the present invention is the value obtained when measured on a film containing a single kind of dye.

Specific examples of the monocarbocyanine dyes include those obtained by means of adding a substituent or substituents to increase solubility to indocarbocyanine dyes, thiacarbocyanine dyes, quinooxacarbocyanine dyes, quinocarbocyanine dyes, quinothiacarbocyanine dyes, selenacarbocyanine dyes, imidacarbocyanine dyes, and oxacarbocyanine dyes. The substituent may be alone or a combination of two or more. Examples of the substituent include an alkyl group, alkoxy group, a hydroxyl group, a carboxyl group, a halogen atom, an allyl group, an alkylcarboxyl group, an alkylalkoxy group, an aralkyl group, an alkylcarbonyl group, a sulfonate alkyl group bound with a metal ion, a nitro group, an amino group, an alkyl amino group, an aryl group, and phenyl ethylene group.

Of these, preferable examples include 1,3,3,1',3',3'-hexamethyl-2,2'-(4,5,4',5'-dibenzo)indocarbocyanine perchlorate, 3,3'-diethyl-2,2'-(6,7,6',7'-dibenzo) thiacarbocyanine iodide, 3,3'-diethyl-2,2'-thiacarbocyanine iodide, 1,1'-diethyl-2,2'-quinocarbocyanine iodide, 3,3'-diethyl-2,2'-selenacarbocyanine iodide, 1,3'-diethyl-4,2'-quinooxacarbocyanine iodide, 3,3',9-triethyl-2,2'-(4,5,4'5'-dibenzo)thiacarbocyanine bromide, 1,1'-diethyl-2,4'-quinocarbocyanine iodide, and 1,3'-diethyl-4,2'-quinothiacarbocyanine iodide.

The medium of type (b) according to the present invention is now described in detail.

The medium (b) has a dye-containing recording layer, an interference layer, and a reflective layer laminated in this order on a transparent substrate or has an interference layer, a dye-containing recording layer, and a reflective layer laminated in this order on the transparent substrate. The transparent substrate may be the same as the one used in the above mentioned medium (a).

Optical characteristics of the dye-containing recording layer in the above mentioned medium (b) preferably hold the following relationships in respect to reflectance, recording sensitivity, and a degree of modulation:

$n1' \geq 1.8$, $0.04 \leq k1' \leq 0.15$, $n2' \geq 1.1$, and $0.04 \leq k2' \leq 0.6$, where n1' is a value of the real part of the complex refractive index of the recording layer to a light beam having a wavelength of λ1, k1' is an absolute value of the imaginary part of the complex refractive index of the recording layer to a light beam of λ1, n2' is a value of the real part of the complex refractive index of the recording layer to a light beam having a wavelength of λ2, and k2' is an absolute value of the imaginary part of the complex refractive index of the recording layer to a light beam of λ2. When n1' is smaller than 1.8 or when k1' is larger than 0.15, it becomes difficult to achieve the reflectance of 65% or higher to the light beam of λ1. On the contrary, k1' smaller than 0.04 deteriorates the recording sensitivity to the light beam of λ1. In addition, n2' smaller than 1.1 and k2' larger than 0.46 are not preferable in that they cause the reflectance to the light beam of λ2 to be lower than 15%. There is no limitation on the minimum value of k2'. However, it is preferable that k2' is 0.04 or larger in respect to the recording sensitivity to the light beam of λ2 because it is desirable that the light beam of λ2 can be used for recording.

A dye used in the recording layer of the medium (b) may be any one of adequate dyes as long as the optical constants (n1', k1', n2', and k2') of the recording layer are in the above mentioned range. Examples of the dye include phthalocyanine dyes, polymethine dyes, cyanine dyes, azo dyes, and naphthoquinone dyes. The phthalocyanine dyes are preferable in respect to light resistance and durability of the dyes. In addition, a phthalocyanine dye represented by the general formula (1) is most preferable in respect to the above mentioned optical constants and the recording sensitivity of the recording layer, and recording characteristics such as a degree of modulation, deformation of a reproduced waveform, an error rate, and a jitter value:

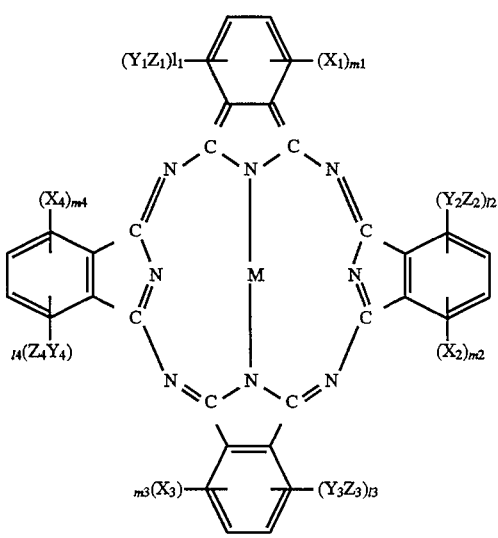

(1)

wherein M is two hydrogen atoms, metals, metal oxides, or metal halides; Y1, Y2, Y3, and Y4 each are oxygen or sulfur; Z1, Z2, Z3, and Z4 each are a hydrocarbon group having from 4 to 12 carbon atoms or a group having from 4 to 12 carbon atoms and one or more atoms of at least one element selected from the group consisting of oxygen, nitrogen, sulfur and halogen; X1, X2, X3, and X4 each are a halogen, $l_1$, $l_2$, $l_3$, and $l_4$ each are 1 or 2; and $m_1$, $m_2$, $m_3$, and $m_4$ are each an integer of from 0 to 3.

Specific examples of M of the phthalocyanine dye represented by the above general formula (1) include divalent metals such as Cu, Pd, Ni, Mg, Zn, Pb, and Cd; metal oxides such as VO; and metal halide such as AlCl. On the other hand, Z1, Z2, Z3, and Z4 each are a non-substituted or substituted hydrocarbon group having from 4 to 12 carbon atoms. Specific examples thereof include saturated hydrocarbons such as a butyl group, a pentyl group, a hexyl group, a heptyl group, an octyl group, a nonyl group, a decyl group, a dodecyl group, a cyclohexyl group, and a dimethylcyclohexyl group; and unsaturated hydrocarbon groups such as a butenyl group, a hexenyl group, an octenyl group, a dodecenyl group, a phenyl group, a methylphenyl group, a butylphenyl group, and a hexylphenyl group. These hydrocarbons may be linear or branched. In addition, these hydrocarbons may be substituted by a halogen, an amino group, or an ether group. Even in the case where the hydrocarbon is substituted by amino or ether groups, the total number of carbons in $Z_1$ through $Z_4$ is from 4 to 12. The halogen represented by X1, X2, X3, and X4 may be, for example, fluorine, chlorine, bromine, and iodine.

There is no limitation on the position of the above mentioned substituents, X1 through X4 and Y1 through Y4, bound to the benzene ring forming phthalocyanine. In addition, four benzene rings in one molecule may have different types and numbers of substituents.

Specific examples of the phthalocyanine dyes are as follows:

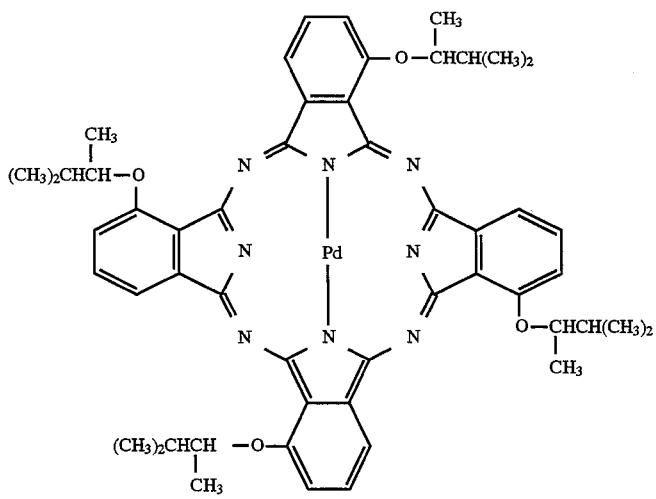

-continued
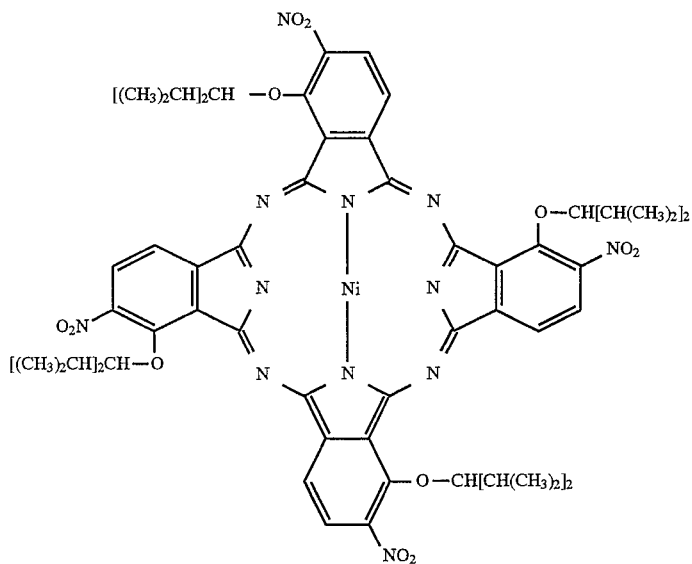
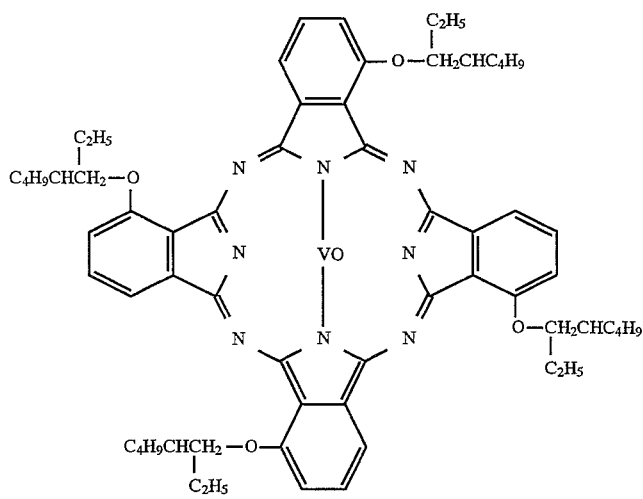
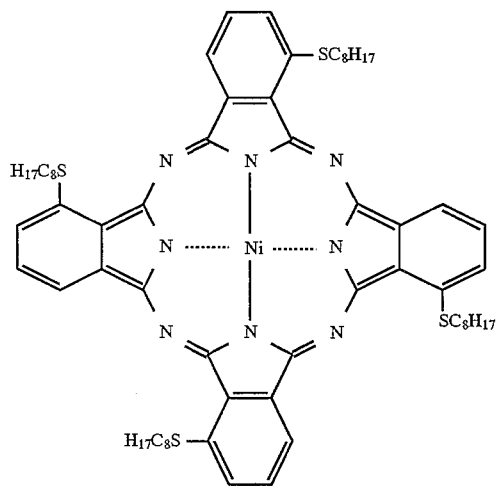

-continued
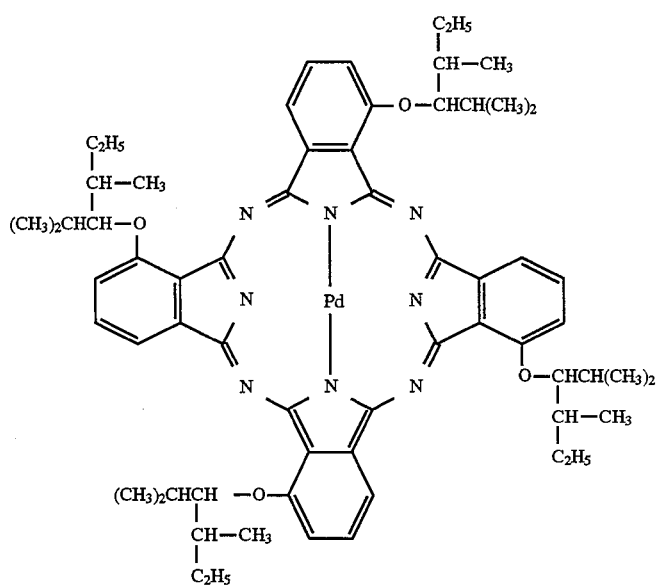
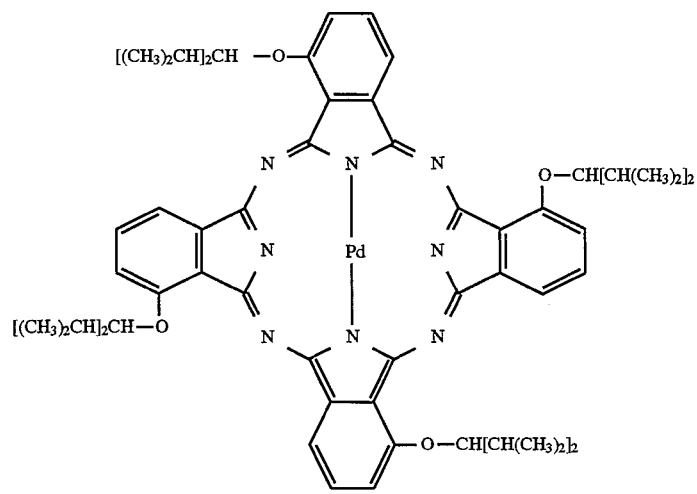
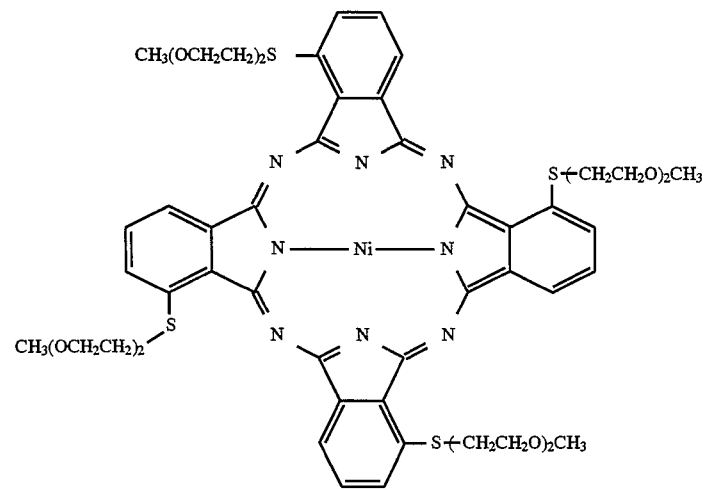

-continued
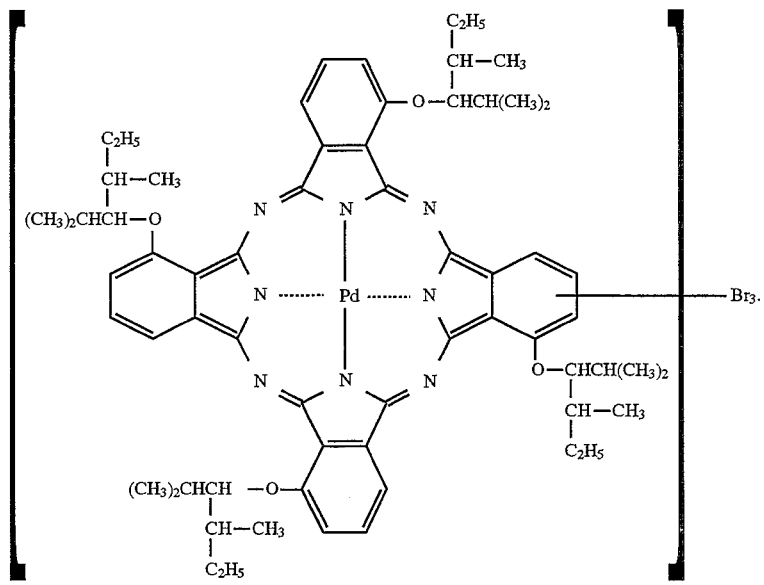
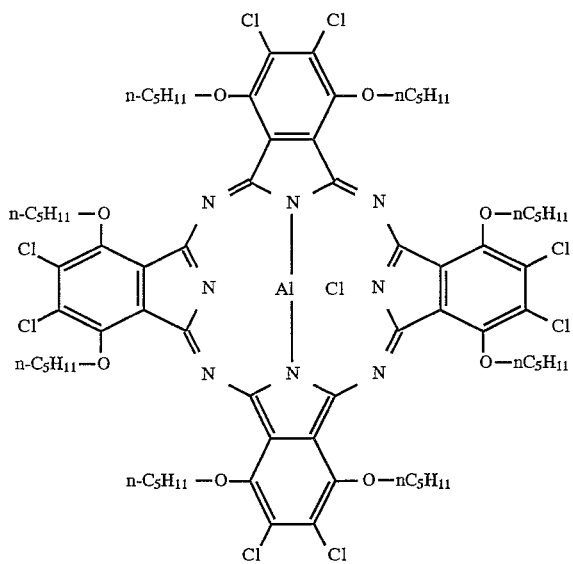

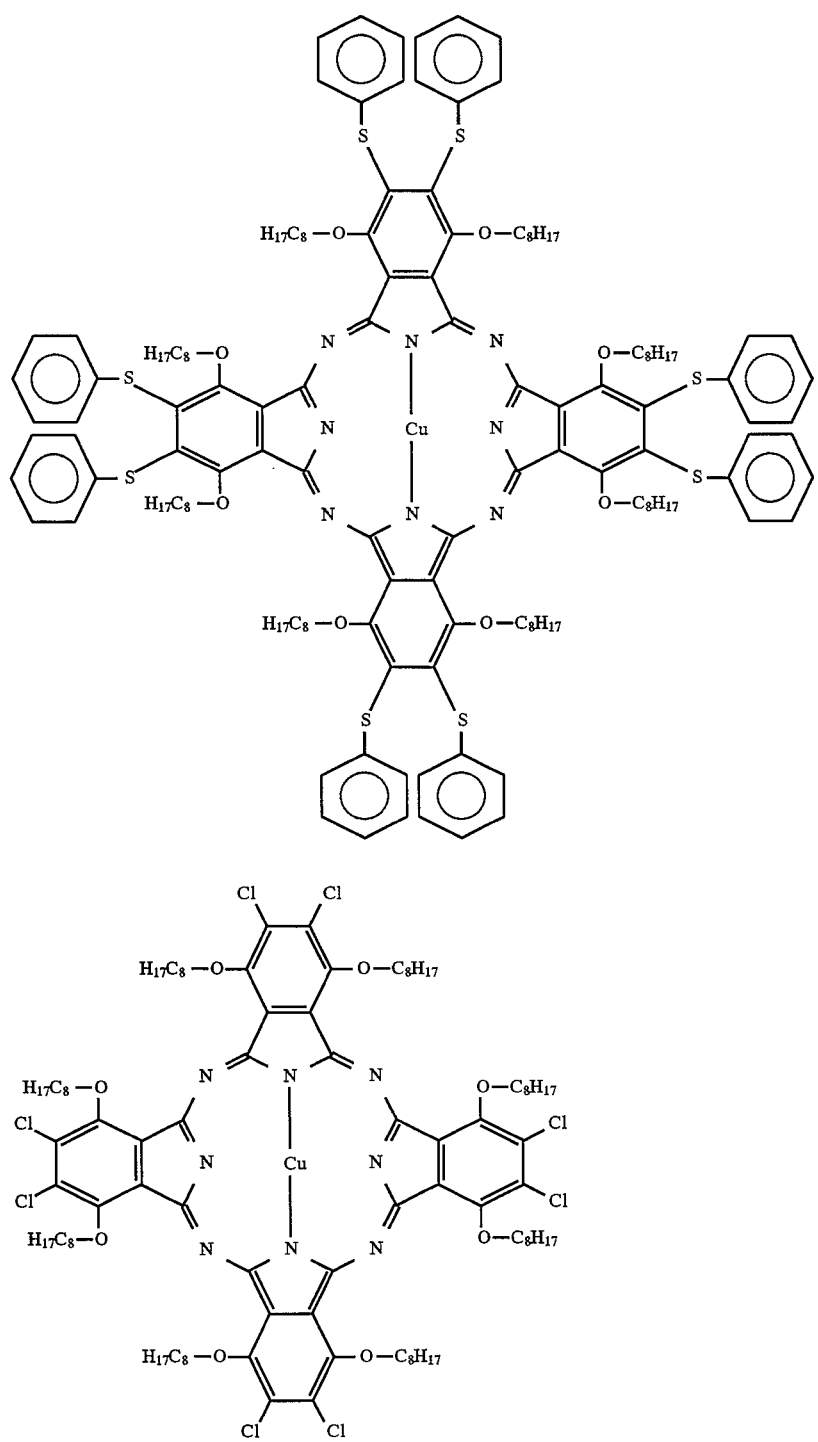

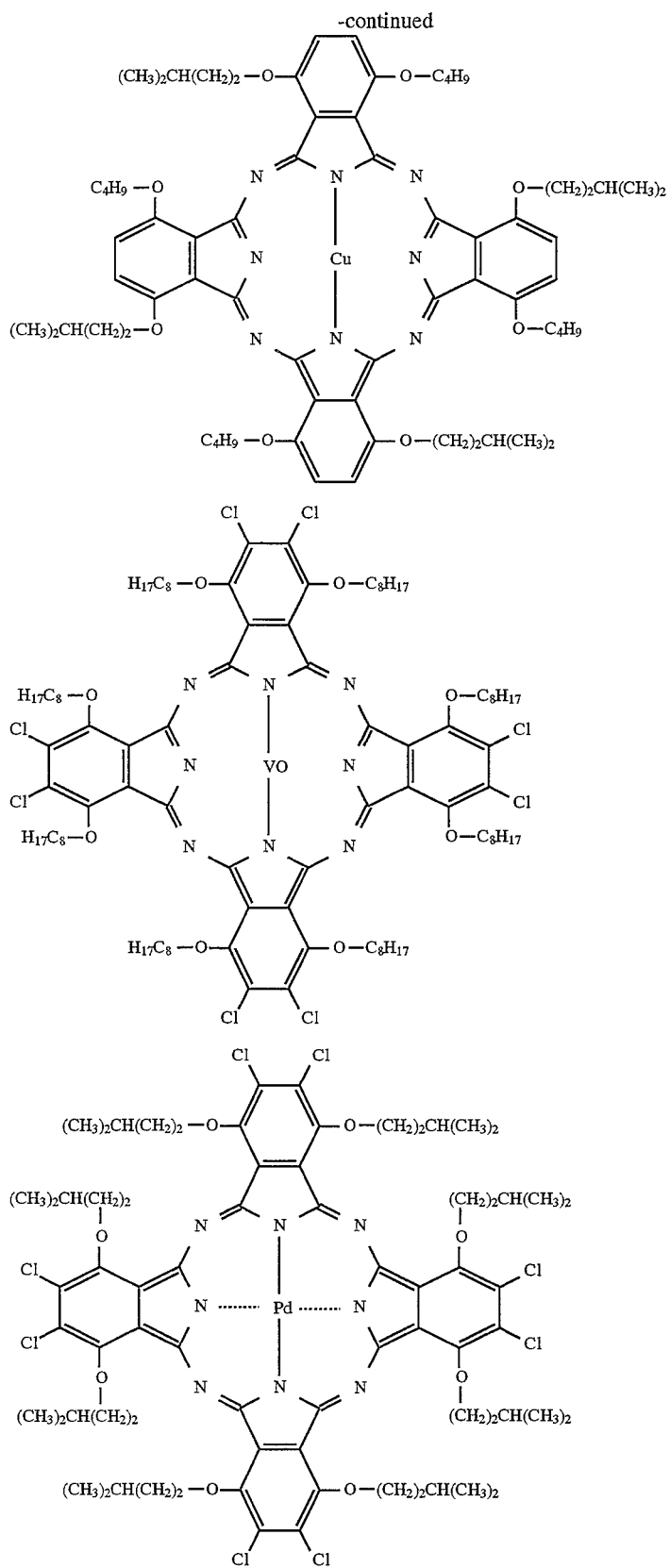

More specifically, examples of the phthalocyanine dyes are those disclosed in U.S. Pat. No. 5,124,067, which is hereby incorporated by reference.

Next, an interference layer used in the medium (b) is described.

The film thickness of the interference layer affects not only the reflectance but also the recording characteristics such as the degree of modulation and the recording sensitivity. In the present invention, the film thickness of the interference layer depends on the material used therefor ranging from 30–500 nm, preferably 50–300 nm. Provided that the refractive index of the interference layer is ni and the film thickness is di (nm), it is preferable that ni×di is in a range from 100 to 300 to the light beams having the wavelengths of λ1 and λ2, respectively. When ni×di is smaller than 100, the reflectance to the light beam having the wavelength of λ2 becomes lower than 15% and the degree of modulation is small. On the contrary, when the ni×di is larger than 300, the reflectance to the light beam having the wavelength of λ1 becomes lower than 65% and the recording sensitivity may sometimes be deteriorated depending on the type of the material used for the interference layer.

The material used for the interference layer may be, for example, an inorganic dielectric, a polymer, or a dye. More specifically, the inorganic dielectric may be, for example, an oxide or a nitride of Si, Al, Ti, Ta, Zr, Sc, Hf, and Y and others; or a sulfide of Zn, Cd, and Sn and others. These materials may be used alone. Alternatively, a combination of a plurality of these materials may be employed.

The polymer may be, for example, a thermoplastic resin or a thermosetting resin. Specific examples of the polymer include acrylic resins, polyvinyl acetate resins, vinylpyrrolidone resins, vinyl alcohol resins, butyral resins, formal resins, cellulose resins, silicone resins, polysiloxane resins, phenol resins, and polyimide resins, and copolymers thereof.

The above mentioned inorganic dielectric and polymer are normally transparent to the light beams of λ1 and λ2, and have a similar refractive index.

On the contrary, the light absorption characteristics and the refractive index to the light beams of λ1 and λ2 are different from dye to dye when a dye or dyes are used for the interference layer. It is apparent that the value of ni×di should meet the above mentioned conditions to the light beams of different wavelengths of λ1 and λ2, wherein ni represents a value of the real part of the complex refractive index. In addition, the light absorption characteristics are also important to take the possible effect of the present invention. An excessively large absorbance prevents the interference layer from having a desired reflectance. Considering the reflectance, it is preferable that the absolute value of the imaginary part of the complex refractive index of the dye is 0.15 or smaller to the light beam of λ1 and is 0.2 or smaller to the light beam of λ2.

Though there is no specific limitation on the dye used as long as it meets the above mentioned conditions, it is preferable to use the one having the maximum absorbance at shorter wavelength than 630 nm, and having a high refractive index at from 630 to 830 nm and a smaller absorbance at that wavelength range. Specific examples of such dye include cyanine dyes, squarylium dyes, azo dyes, porphyrin dyes, and tetra-azaporphyrin dyes. Of these, the azo dyes are preferable in respect to facility of film preparation and durability. Further, the azo dye, which may be a mixture of two or more dyes, represented by the following general formula (2) or a metal complex of that azo dye are most preferable in respect to recording characteristics such as degree of modulation, deformation of a reproduced waveform, an error rate, and jitter value:

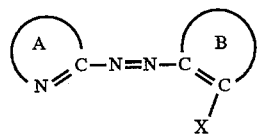

(2)

wherein A is a residue forming a heterocyclic ring along with the nitrogen and carbon atoms bonded therewith; B is a residue forming an aromatic ring along with two carbon atoms bonded therewith; and X is a group having an active hydrogen.

More specifically, the residue forming the heterocyclic ring represented by A in the azo dye of the above general formula (2) may be, for example, a thiazole ring, a benzothiazole ring, a pyridobenzothiazole ring, a benzopyridothiazole ring, a pyridothiazole ring, a pyridine ring, and a quinoline ring. It is preferable that this residue is either the pyridine ring or the thiazole ring.

These heterocyclic rings preferably have one or more substituents. Specific examples of the substituent include an alkyl group, an alkyl halide group, an aryl group, an alkoxy group, an alkoxy halide group, an aryloxy group, an alkylthio group, an alkylthio halide group, an arylthio group, an aralkyl group, a halogen atom, a cyano group, a nitro group, an ester group, a carbamoyl group, an acyl group, an acylamino group, a sulfamoyl group, a sulfonamide group, an amino group, a hydroxyl group, a phenylazo group, a pyridinoazo group, and a vinyl group. These substituent may optionally have a substituent or substituents. Examples of the preferable substituent for the heterocyclic ring include: an alkyl group having from 1 to 15 carbon atoms and optionally having a substituent or substituents, a fluoroalkyl group having from 1 to 15 carbon atoms and optionally having a substituent or substituents, an alkoxy group having from 1 to 25 carbon atoms and optionally having a substituent or substituents, a halogen atom, a cyano group, a nitro group, an alkylthio group having from 1 to 15 carbon atoms and optionally having a substituent or substituents, a fluoroalkylthio group having from 1 to 15 carbon atoms and optionally having a substituent or substituents, an alkylsulfamoyl group having from 1 to 15 carbon atoms and optionally having a substituent or substituents, a phenylsulfamoyl group having from 6 to 20 carbon atoms and optionally having a substituent or substituents, a phenylazo group optionally having a substituent or substituents, a pyridinoazo group optionally having a substituent or substituents, an ester group having from 2 to 16 carbon atoms, a carbamoyl group having from 2 to 16 carbon atoms, an acyl group having from 2 to 16 carbon atoms, an acylamino group having from 2 to 15 carbon atoms, a sulfonamide group having from 1 to 15 carbon atoms, —NR$^1$R$^2$ (R$^1$ and R$^2$ each are a hydrogen atom, an alkyl group having from 1 to 15 carbon atoms and optionally having a substituent or substituents, or a phenyl group optionally having a substituent or substituents, in which R$^1$ and R$^2$ optionally forming a five- or six-membered ring), a hydroxyl group, —CR$^3$=C(CN)R$^4$ (R$^3$ is a hydrogen atom or an alkyl group having from 1 to 6 carbon atoms, and R$^4$ is a cyano group or an alkoxycarbonyl group having from 2 to 7 carbon atoms). The above mentioned alkyl moiety may be sulfonated, nitrated, cyanated, halogenated, acetylated, or hydroxylated.

Examples of the residue forming the aromatic ring represented by B in the general formula (2) include a benzene ring, a naphthalene ring, a pyridone ring, a pyridine ring, and a pyrazole ring. It is preferable that the aromatic ring is a benzene ring, and particularly the benzene ring substituted by at least one electron donating group. Examples of such substituent include an alkyl group, an alkyl halide group, an aryl group, an alkoxy group, an alkoxy halide group, an aryloxy group, an alkylthio group, an alkylthio halide group, an arylthio group, an aralkyl group, a halogen atom, a cyano group, a nitro group, an ester group, a carbamoyl group, an acyl group, an acylamino group, a sulfamoyl group, a sulfonamide group, an amino group, a hydroxyl group, a phenylazo group, a pyridinoazo group, and a vinyl group. These substituents optionally have a substituent or substituents. Preferable examples of the substituent for the aromatic ring include an alkyl group having from 1 to 15 carbon atoms and optionally having a substituent or substituents, a fluoroalkyl group having from 1 to 15 carbon atoms and optionally having a substituent or substituents, and alkoxy group having from 1 to 25 carbon atoms and optionally having a substituent or substituents, a halogen atom, a cyano group, a nitro group, an alkylthio group having from 1 to 15 carbon atoms and optionally having a substituent or substituents, a fluoroalkylthio group having from 1 to 15 carbon atoms and optionally having a substituent or substituents, an alkylsulfamoyl group having from 1 to 15 carbon atoms and optionally having a substituent or substituents, a phenylsulfamoyl group having from 6 to 20 carbon atoms and optionally having a substituent or substituents, a phenylazo group optionally having a substituent or substituents, a pyridinoazo group optionally having a substituent or substituents, an ester group having from 2 to 16 carbon atoms, a carbamoyl group having from 2 to 16 carbon atoms, an acyl group having from 2 to 16 carbon atoms, an acylamino group having from 1 to 15 carbon atoms, a sulfonamide group having from 1 to 15 carbon atoms, —$NR^1R^2$ ($R^1$ and $R^2$ each are a hydrogen atom, an alkyl group having from 1 to 15 carbon atoms and optionally having a substituent or substituents, or a phenyl group optionally having a substituent or substituents, in which $R^1$ and $R^2$ optionally forming a five- or six-membered ring), a hydroxyl group, —$CR^3$=$C(CN)R^4$ ($R^3$ is a hydrogen atom or an alkyl group having from 1 to 6 carbon atoms, and $R^4$ is a cyano group or an alkoxycarbonyl group having from 2 to 7 carbon atoms). Particularly preferable examples of the electron donating group include a monoalkylamino group having from 1 to 8 carbon atoms and optionally having a substituent or substituents, a dialkylamino group having from 2 to 8 carbon atoms and optionally having a substituent or substituents, an alkoxy group having from 1 to 8 carbon atoms and optionally having a substituent or substituents, an alkyl group having from 1 to 8 carbon atoms and optionally having a substituent or substituents, an aryloxy group having from 6 to 12 carbon atoms and optionally having a substituent or substituents, an aralkyl group having from 5 7 to 12 carbon atoms and optionally having a substituent or substituents, a carbamoyl group, an amino group, and a hydroxyl group. The above mentioned alkyl moiety may be sulfonated, nitrated, cyanated, halogenated, acetylated, or hydroxylated.

The group X of the azo dye represented by the general formula (2) may be any group and is not limited to a specific one as long as it has an active hydrogen. Preferable examples of the group X include —OH, —COOH, —$SO_3H$, —$B(OH)_2$, —$NHSO_2R^5$ ($R^5$ is a hydrogen atom, an alkyl group having from 1 to 25 carbon atoms and optionally having a substituent or substituents, or a phenyl group optionally having a substituent or substituents), —$CONH_2$, —$SO_2NH_2$, and —$NH_2$. Particularly preferable groups are —OH, —COOH, —$SO_3H$, and —$NHSO_2R^5$ ($R^5$ is the same as above). When X is a group to be dissociative into an anion such as —OH, —COOH and —$SO_3H$, this group may be used as a salt with a cation, while it may be used as it is, to form an azo metal complex compound. Examples of the cation applicable include inorganic cations such as $Na^+$, $Li^+$, and $K^+$, and organic cations such as $P^+(C_6H_5)_4$, $N^+(C_2H_9)_4$, $N^+(C_4H_9)_4$, and $C_6H_5N^+(CH_3)_3$.

In the present invention, the above mentioned azo dyes are used in the form of a metal complex. The metal having a capability of forming a complex with the azo dye may preferably be, for example, transition metals such as Ni, Co, Fe, Ru, Rh, Pd, Cu, Os, Ir, and Pt. Of these, Ni, Co, Cu, and Pd are particularly preferable. These metals are used in the form of acetate, halide, or $BF^{4-}$ salt, and are coordinated as a complex with an azo compound in the form of $Ni^{2+}$, $Co^{2+}$, $Co^{3+}$, $Cu^{2+}$, and $Pd^{2+}$. The azo-metal complex compound may be used alone. Alternatively, a combination of two or more such compounds may be employed.

The metal complex of the azo dye used in the present invention may be synthesized according to a method disclosed in, for example, "Analytica Chemica Acta 140" (1982), by Furukawa, pages 281–289.

Preferable examples of the metal complex of the azo compound used in the present invention include metal complex compounds of $Ni^{2+}$, $Co^{2+}$, $Co^{3+}$, $Cu^{2+}$, and $Pd^{2+}$ etc with azo dyes such as:

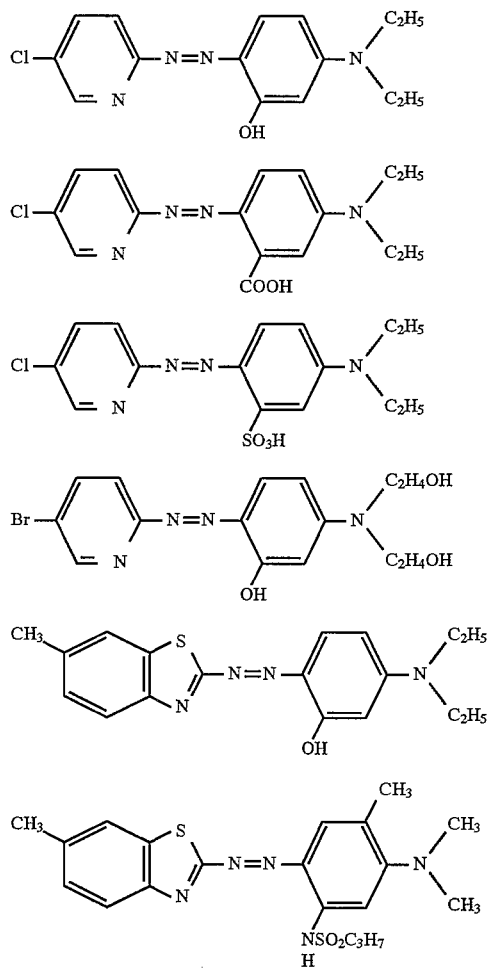

-continued

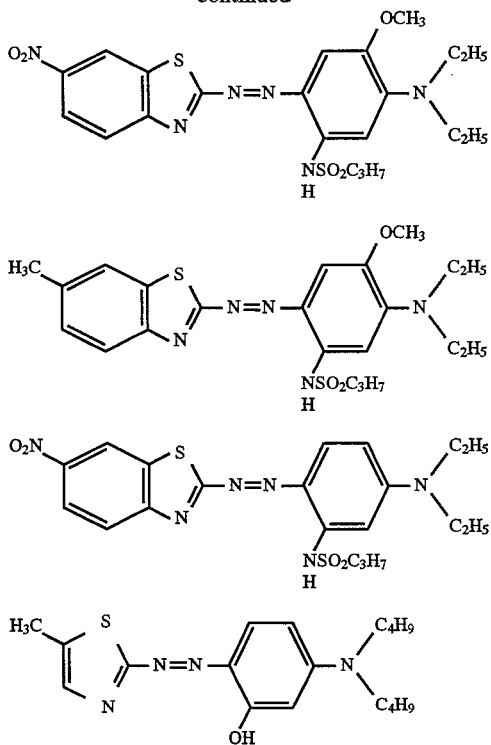

Specific examples of these compounds are those disclosed in Japanese Patent Publication No. 5-67438 and Table 1-9 of International Patent Laid-Open No. WO91/18950, which is hereby incorporated by reference.

A method of producing a medium according to the present invention is described now.

In the present invention, the recording layer is deposited on a transparent substrate. The deposition of the recording layer may be achieved through any one of adequate methods including spin coating, dip coating, spray coating, and vacuum deposition. Of these, the spin coating is preferable in respect to its simplicity.

When attempting to deposit the recording layer by means of the spin coating, it should be considered to avoid any damages to the substrate in choosing the solvent used. The solvent may preferably be a non-polar solvent or a polar solvent. Examples of the non-polar solvent include aliphatic or alicyclic hydrocarbon solvents such as hexane, heptane, octane, methylcyclohexane, ethylcyclohexane, dimethylcyclohexane, trimethylcyclohexane, propylcyclohexane, and cyclooctane, and ether solvents such as dipropylether and dibuthylether. Examples of the polar solvent include alcohol solvents such as ethyl alcohol, propyl alcohol, butyl alcohol, furfuryl alcohol, ethylene glycol monomethyl ether, ethylene glycol monoethyl ether, and tetrafluoropropanol. Of course, these solvents may be mixed with aromatic hydrocarbons such as toluene, xylene, and propylbenzene, ester solvents such as ethyl acetate, butyl acetate, amyl acetate, and ethylene glycol monoethyl ether acetate, ketone solvents such as methyl ethyl ketone, methyl isobutyl ketone, and cyclohexanone, halogen-containing solvents such as chloroform, carbon tetrachloride, and methyl chloroform, and ether solvents such as dioxane, and tetrahydrofuran, in an amount not causing a damage to the substrate. Considering the solubility to these solvents, it is preferable that each group represented by Z1, Z2, Z3, and Z4 of the phthalocyanine dye having the above general formula (1) is a group having from 6 to 12 carbon atoms. The recording layer may be heated to dry the solvent after being deposited on the substrate through the spin coating.

In depositing the recording layer the dye may be added with, if necessary, additives such as quenchers, thermal decomposition promoters for the dye, ultraviolet absorbers, and adhesive. Alternatively, a substituent having such functions may be introduced into the dyes.

Preferable examples of the quencher include metal complexes based on acetyl acetonate, bisdithiol such as bisdithio-a-diketone, and bisphenyldithiol, thiocatechol, salicylaldehyde oxime, and thiobisphenolate. In addition, amine-based complexes may also be used preferably.

There is no specific limitation on the thermal decomposition promoter as long as promotion of thermal decomposition of the dye can be determined by means of thermogravimetric analysis (TG analysis). The thermal decomposition promoter may be, for example, a metal compound such as a metallic anti-knocking agent, a metallocene compound, and an acetylacetonato metal complex.

In the deposition of the recording layer, a binder may be added thereto, if necessary. Preferable examples of the binder include nitrocellulose, cellulose acetate, ketone resins, acrylic resins, poly(vinyl buthyral), polycarbonate, and polyolefin. A dye or dyes other than those described above may be added to the recording layer in order to improve the recording characteristics.

The dyes may preferably be coated through the following method. More specifically, the light absorbing dye is dissolved into a solvent at a rate of 0.05 to 30% by weight, preferably 0.5 to 20% by weight. The resultant solution is coated with a spin coater. A film thickness of the recording layer is from 70 to 300 nm, and preferably from 80 to 250 nm, considering the degree of modulation and the reflectance. It is apparent that the excessively small film thickness inherently causes thermal radiation to a metal reflective layer described below, sometimes causing deterioration of the sensitivity. The film thickness is determined such that the recording layer has a proper absorbance to the light beams having the selected wavelengths of from 630 to 690 nm and from 770 to 830 nm.

In depositing the recording layer on the substrate, a layer of an inorganic compound or of a polymer may be provided on the substrate to improve chemical resistance, reflectance, and recording sensitivity of the substrate.

The interference layer according to the present invention may be deposited through, for example, spin coating, dip coating, spray coating, vacuum deposition, or sputtering.

When attempting to deposit the interference layer by means of the spin coating, it should be considered to avoid any damages to the recording layer in choosing the solvent used. The solvent may preferably be a non-polar solvent or a polar solvent. Specific examples of the solvent are as same as those described in conjunction with the recording layer. In the medium having the interference layer, two layers, i.e., the recording layer and the interference layer, may be deposited through spin coating. In this event, a polar solvent is used for the deposition of the interference layer when a non-polar solvent is used for the deposition of the recording layer. Likewise, when a polar solvent is used for the deposition of the recording layer, the interference layer is deposited with a non-polar solvent. To deposit an interference layer containing a dye or dyes, additives such as quenchers, ultraviolet absorbers, and adhesives may be used if necessary. Alternatively, a substituent having such functions may be introduced into the dyes.

In the present invention, a reflective layer is provided on the recording layer for the medium (a) and on either the interference layer or the recording layer for the medium (b). The reflective layer may be deposited through, for example, vacuum deposition or sputtering. Preferable examples of the material of the reflective layer include metals having a high reflectance to the light beams of λ1 and λ2. The material may be, for example, metals such as Au, Ag, Al, Cu, and Pt and alloys containing these metals. Of these, gold is preferable in respect to the reflectance and the durability. Of course, other metal or metals may be added thereto in a small amount. An amount of other metals added is 10% or less, preferably 5% or less, and more preferably 2% or less. The film thickness of the reflective layer is typically from 40 to 300 nm, and preferably from 60 to 200 nm.

In the present invention, a protective layer may be provided on the reflective layer or two media may be adhered to each other to protect the reflective layer.

The protective layer may be formed through, as for the recording layer, coating such as spin coating and casting, sputtering, or chemical vapor deposition. Alternatively, a film or a substrate may be adhered. Of these methods, the spin coating is preferable.

A material of the protective layer is not limited to a specific one as long as it can protect the reflective layer from an external force. Examples of organic compounds to be applicable as the protective layer include thermoplastic resins, thermosetting resins, and ultraviolet curing resins. Of these, the ultraviolet curing resins are preferable. Alternatively, the protective layer may be formed of an inorganic material. Examples of such inorganic materials include $SiO_2$, $SiN_4$, $MgF_2$, and $SnO_2$. The thermoplastic resins and the thermosetting resins may be dissolved into an adequate solvent to prepare a coating solution, which is then applied to the reflective layer and dried thereon as a protective layer. The ultraviolet curing resins may be as it is or dissolved into an adequate solvent to prepare a coating solution. This coating solution is then applied to the reflective layer, to which an ultraviolet ray is irradiated to cure the resin, thereby forming the protective layer. Examples of the ultraviolet resin include acrylate resins such as urethane acrylate, epoxy acrylate, polyester acrylate and epoxy resins. In addition, silicone-based hard coating resin may be used. These resins may be used alone or in the form of a mixture. Further, the resin may be laminated into a multi-layer structure rather than a single layer of the film.

In addition, an ultraviolet curing resin or an inorganic thin film may be formed on a mirror-surface side of the substrate to protect the surface and to prevent adhesion of dust.

The optical recording medium according to the present invention so obtained may be recorded or played back by means of focusing a laser beam onto the recording layer. A signal used upon recording may be, for example, an EFM modulated signal used for CDs. The medium according to the present invention has a recording layer with the dye having absorption at a wavelength of around 770 to 830nm. In this medium, the reflectance of 65% or higher can be achieved to the light beam having the selected wavelength of from 770 to 830. The information can thus be recorded and reproduced with a laser beam having a wavelength of around 780 nm. In addition, the recorded information may be reproduced by using a commercially available CD or CD-ROM player. The characteristics of the reproduced signal well satisfy the CD-R standards, or the Orange Book Standards. Further, the reflectance of 15% or higher can be achieved to the light beam having a selected wavelength of from 630 to 690 nm. The information on the medium of the present invention may thus be reproduced by using a player for high-density, in which a laser of a selected wavelength of from 630 to 690 nm is mounted. Though the light beam used for the players for high-density has a wavelength of from 630 to 690 nm, a laser used for practical applications have a wavelength of, for example, around 635 nm, 650 nm or 680 nm. The medium according to the present invention has absorption at 630 to 690 nm, so that information can be recorded thereon by using a light beam having a selected wavelength of from 630 to 690 nm.

The foregoing features of the present invention will be more fully apparent in the context of a specifically delineated set of examples and comparative examples. However, it should be understood that the present invention is not limited to those particular examples as long as it does not depart from the spirit and scope of the appended claims.

EXAMPLE 1

As a dye to form a recording layer, 0.29 of monocarbocyanine dye NK3239 (produced by Nippon Kanko Shikiso Kenkyusho KK) represented by the following formula (3) and 0.01 g of pentamethine cyanine dye NK2929 (produced by Nippon Kanko Shikiso Kenkyusho KK) represented by the following formula (4) were dissolved into 10 ml of 2,2,3,3-tetrafluoro-1-propanol (produced by Tokyo Kasei KK) to prepare a dye solution.

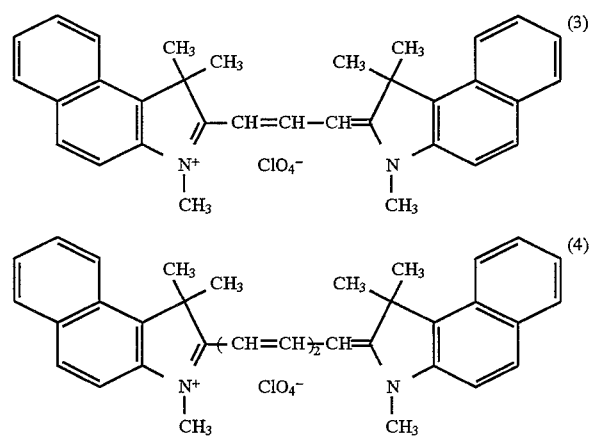

A substrate used was a polycarbonate substrate of a disc shape having a thickness of 1.2 mm and a diameter of 120 mmφ and having a spiral pre-groove formed on its surface with a depth of 130 nm, a width of 0.5 μm, and a pitch of 1.6 μm.

The dye solution was coated on the surface of the substrate by spin coating at a rotation rate of 1200 rpm to form a layer. This layer was dried at 70° C. for 2 hours to provide a recording layer having a film thickness of approximately 150 nm. For the optical constants of this recording layer, the refractive index (the value of the real part of the complex refractive index) was 2.1, and the attenuation coefficient (the absolute value of the imaginary part of the complex refractive index) was 0.08 at the wavelength of 780 nm. The refractive index and the attenuation coefficient were 2.0 and 0.17, respectively, at 680 nm while the refractive index and the attenuation coefficient were 2.5 and 0.26, respectively, at 635 nm. The refractive index and the attenuation coefficient of the recording layer were measured and calculated after coating the same dye solution on a glass substrate by spin coating.

Then, an Au film was formed by sputtering on this recording layer by using a sputtering device CDI-900 (available from Balzers Co.) to form a reflective layer of 80 nm thick. Sputtering conditions were as follows:

Sputtering power; 2.5 kW

Sputtering gas (argon gas) pressure; 1.0×10$^{-2}$ Torr. An ultraviolet curing resin SD-17 (available from Dainippon Ink Chemicals) was coated on the reflective layer by spin coating, to which an ultraviolet ray was irradiated to form a protective film of 6 μm in thickness.

To the medium obtained, a laser was irradiated at a linear speed of 2.8 m/sec. with a recording power of 8 mW to record information by using an optical disc estimation device DDU-1000 (available from Pulstec Industrial Co., Ltd.) with a laser head for a red semiconductor laser of 680 nm and a CD encoder (available from KENWOOD). After recording, the recorded signal was reproduced at a linear speed of 1.4 m/sec by using the same estimation device. As a result, the reflectance was 58% and the error rate was less than 5 cps, when measured by using a CD decoder DR3552 (available from KENWOOD). The degree of modulation of the shortest pit (I3/Itop) was 0.45. Jitter value was measured by using a jitter meter LJM-1851 (available from Leader Electronics Corp.). The result was good.

In addition, the recorded sample was subjected to a reproduction estimation at a linear speed of 1.4 m/sec by using an optical disc estimation device (available from Pulstec Industrial Co., Ltd.) with a laser head for a near infrared semiconductor laser capable of providing a reproducing wavelength of 780 nm. As a result, the reflectance was 70%, the error rate was less than 5 cps, and I3/Itop was 0.50. In addition, the reproduced signal had small deformation in waveform, and the jitter value was good to satisfy the Orange Book Standards.

On the other hand, to the medium obtained, a laser was irradiated at a linear speed of 2.8 m/sec. with a recording power of 10 mW to record information by using an optical disc estimation device DDU-1000 (available from Pulstec Industrial Co., Ltd.) with a laser head for a near infrared semiconductor laser of 780 nm and a CD encoder (available from KENWOOD). After recording, the recorded signal was reproduced by using a commercially available CD player CDX-1050 (available from YAMAHA) having a reproducing wavelength of 786 nm. As a result, the reflectance was 70%, the error rate was less than 5 cps, and I3/Itop was 0.48. The jitter value was good.

In addition, the recorded sample was subjected to a reproduction estimation at a linear speed of 1.4 m/sec. by using an optical disc estimation device DDU-1000 (available from Pulstec Industrial Co., Ltd.) with a laser for a red semiconductor laser capable of providing a reproducing wavelength of 680 nm. As a result, the reflectance was 58%, the error rate was less than 5 cps, and I3/Itop was 0.47. The jitter value was good.

Further, the recorded sample was subjected to a reproduction estimation at a linear speed of 1.4 m/sec by using an optical disc estimation device DDU-1000 (available from Pulstec Industrial Co., Ltd.) with a laser head for a red semiconductor laser capable of providing a reproducing wavelength of 635nm. As a result, the reflectance was 28%, the error rate was less than 5 cps, and I3/Itop was 0.50. The jitter value was good.

The spectral absorption maximum of the dye used was measured by means of coating the dye solution on a glass substrate by spin coating, and drying it at 70° C. for 2 hours to form a thin film of the dye. The film was then subjected to measurement by using an ultraviolet-visible ray spectrophotometer UV-2200 (available from Shimadzu Corporation). As a result, the spectral absorption maximum of NK3239 was 590 nm and that of NK2929 was 730 nm.

EXAMPLE 2

Example 1 was repeated to produce a medium except that 0.2 g of monocarbocyanine dye NK3239 (produced by Nippon Kanko Shikiso Kenkyusho KK) represented by the above formula (3) and 0.046 g of dicarbocyanine dye NK2929 (produced by Nippon Kanko Shikiso Kenkyusho KK) represented by the above formula (4) were dissolved into 10 ml of 2,2,3,3-tetrafluoro-1-propanol (produced by Tokyo Kasei KK) to prepare a dye solution.

For the medium obtained, the recording and reproduction tests were made as in Example 1. As a result, the reflectance, the degree of modulation, the error rate, and the jitter value were all good at each wavelength.

In addition, the absorption maximum wavelength of each dye used, and the refractive index and the attenuation coefficient of the recording layer were measured in the same manner as in Example 1.

EXAMPLE 3

0.2 g of monocarbocyanine dye NK3239 (produced by Nippon Kanko Shikiso Kenkyusho KK) represented by the above formula (3), 0.01 g of dicarbocyanine dye NK2929 (produced by Nippon Kanko Shikiso Kenkyusho KK) represented by the above formula (4), and 0.01 g of tricarbocyanine dye NK2014 (produced by Nippon Kanko Shikiso Kenkyusho KK) represented by the following formula (5) were dissolved into 10 ml of 2,2,3,3-tetrafluoro-1-propanol(produced by Tokyo Kasei KK). A recording layer of 150 nm thick was then formed in the same manner as in Example 1.

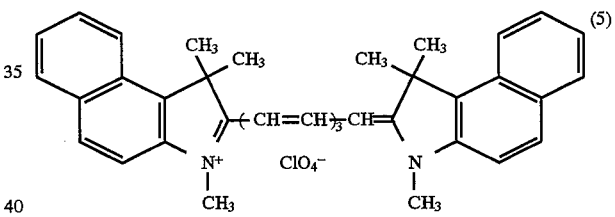

Then, an Au film was formed by sputtering on this recording layer by using a sputtering device CDI-900 (available from Balzers Co.) to form a reflective layer of 100 nm thick. An ultraviolet curing resin SD-17 (available from Dainippon Ink Chemicals) was coated on the reflective layer by spin coating, to which an ultraviolet ray was irradiated to form a protective film of 5 μm in thickness.

For the medium obtained, the recording and reproduction tests were made as in Example 1. As a result, the reflectance, the degree of modulation, the error rate, and the jitter value were all good at each wavelength.

In addition, the absorption maximum wavelength of each dye used, and the refractive index and the attenuation coefficient of the recording layer were measured in the same manner as in Example 1.

EXAMPLE 4

Example 1 was repeated to produce an optical recording medium except that 0.2 g of monocarbocyanine dye NK467 (produced by Nippon Kanko Shikiso Kenkyusho KK) represented by the following formula (6), 0.01 g of dicarbocyanine dye NK2627 (produced by Nippon Kanko Shikiso Kenkyusho KK) represented by the following formula (7), and 0.01 g of tricarbocyanine dye NK2014 (produce d by Nippon Kanko Shikiso Kenkyusho KK) represented by the above formula (5) were dissolved into 10 ml of 2,2,3,3- tetrafluoro-1-propanol (produced by Tokyo Kasei KK) to prepare a dye solution.

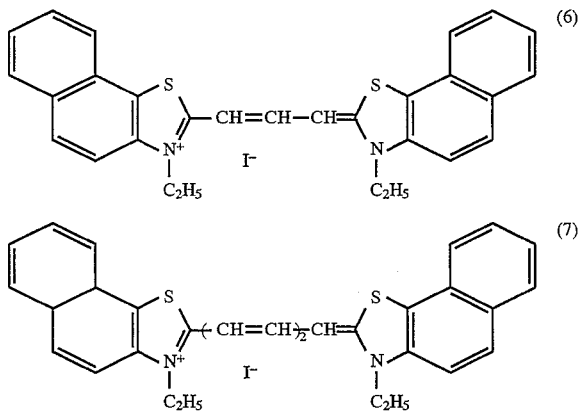

For the medium obtained, the recording and reproduction tests were made as in Example 1. As a result, the reflectance, the degree of modulation, the error rate, and the jitter value were all good at each wavelength.

In addition, the absorption maximum wavelength of each dye used, and the refractive index and the attenuation coefficient of the recording layer were measured in the same manner as in Example 1.

EXAMPLE 5

Example 1 was repeated to produce an optical recording medium except that 0.2 g of monocarbocyanine dye NK3 (produced by Nippon Kanko Shikiso Kenkyusho KK) represented by the following formula (8), 0.01 g of dicarbocyanine dye NK1458 (produced by Nippon Kanko Shikiso Kenkyusho KK) represented by the following formula (9), and 0.01 g of tricarbocyanine dye NK2014 (produced by Nippon Kanko Shikiso Kenkyusho KK) represented by the above formula (5) were dissolved into 10 ml of 2,2,3,3-tetrafluoro-1-propanol (produced by Tokyo Kasei KK) to prepare a dye solution.

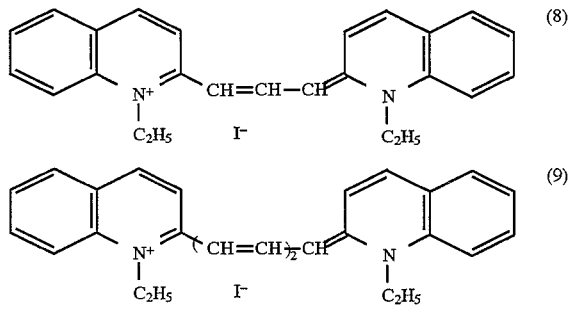

For the medium obtained, the recording and reproduction tests were made as in Example 1. As a result, the reflectance, the degree of modulation, the error rate, and the jitter value were all good at each wavelength.

In addition, the absorption maximum wavelength of each dye used, and the refractive index and the attenuation coefficient of the recording layer were measured in the same manner as in Example 1.

EXAMPLE 6

Example 1 was repeated to produce an optical recording medium except that 0.2 g of monocarbocyanine dye NK3239 (produced by Nippon Kanko Shikiso Kenkyusho KK) represented by the above formula (3), 0.025 g of dicarbocyanine dye NK1456 (produced by Nippon Kanko Shikiso Kenkyusho KK) represented by the above formula (9), and 0.01 g of tricarbocyanine dye NK1666 (produced by Nippon Kanko Shikiso Kenkyusho KK) represented by the following formula (10) were dissolved into 10 ml of 2,2,3,3-tetrafluoro-1-propanol (produced by Tokyo Kasei KK) to prepare a dye solution.

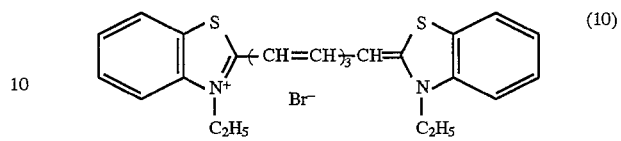

For the medium obtained, the recording and reproduction tests were made as in Example 1. As a result, the reflectance, the degree of modulation, the error rate, and the jitter value were all good at each wavelength.

In addition, the absorption maximum of each dye used, and the refractive index and the attenuation coefficient of the recording layer were measured in the same manner as in Example 1.

EXAMPLE 7

Example 1 was repeated to produce an optical recording medium except that 0.2 g of monocarbocyanine dye NK3 (produced by Nippon Kanko Shikiso Kenkyusho KK) represented by the above formula (8), 0.01 g of dicarbocyanine dye NK2627 (produced by Nippon Kanko Shikiso Kenkyusho KK) represented by the above formula (7), and 0.025 g of tricarbocyanine dye NK1666 (produced by Nippon Kanko Shikiso Kenkyusho KK) represented by the above formula (10) were dissolved into 10 ml of 2,2,3,3-tetrafluoro-1-propanol (produced by Tokyo Kasei KK) to prepare a dye solution.

For the medium obtained, the recording and reproduction tests were made as in Example 1. As a result, the reflectance, the degree of modulation, the error rate, and the jitter value were all good at each wavelength.

In addition, the absorption maximum wavelength of each dye used, and the refractive index and the attenuation coefficient of the recording layer were measured in the same manner as in Example 1.

COMPARATIVE EXAMPLE 1

Example 1 was repeated to produce an optical recording medium except that the dye used was only the monocarbacyanine dye NK3239 (produced by Nippon Kanko Shikiso Kenkyusho KK) represented by the above formula (3). For the medium obtained, the recording and reproduction tests were made as in Example 1. As a result, it was impossible to record a signal with the wavelength of 780nm.

In addition, the refractive index and the attenuation coefficient of the recording layer were measured in the same manner as in Example 1.

COMPARATIVE EXAMPLE 2

Example 1 was repeated to produce an optical recording medium except that 0.14 g of monocarbocyanine dye NK3239 (produced by Nippon Kanko Shikiso Kenkyusho KK) represented by the above formula (3), and 0.06 g of dicarbocyanine dye NK2929 (produced by Nippon Kanko Shikiso Kenkyusho KK) represented by the above formula (4) were dissolved into 10 ml of 2,2,3,3-tetrafluoro-1-propanol (produced by Tokyo Kasei KK) to prepare a dye solution, and that a mixing ratio of dicarbocyanine dye to monocarbocyanine dye in the dye solution was increased from 5% in Example 1 to 30%.

For the medium obtained, the recording and reproduction tests were made as in Example 1. As a result, no satisfactory reproduction signal was obtained at each wavelength.

In addition, the refractive index and the attenuation coefficient of the recording layer were measured in the same manner as in Example 1.

COMPARATIVE EXAMPLE 3

Example 1 was repeated to produce an optical recording medium except that 0.1 g of monocarbocyanine dye NK3239 (produced by Nippon Kanko Shikiso Kenkyusho KK) represented by the above formula (3), and 0.1 g of tricarbocyanine dye NK2014 (produced by Nippon Kanko Shikiso Kenkyusho represented by the above formula (5) were dissolved into 10 ml of 2,2,3,3-tetrafluoro-1-propanol (produced by Tokyo Kasei KK) to prepare a dye solution.

For the medium obtained, the recording and reproduction tests were made as in Example 1. As a result, no satisfactory reproduction signal was obtained at each wavelength.

In addition, the refractive index and the attenuation coefficient of the recording layer were measured in the same manner as in Example 1.

Table 1 below shows the spectral absorption maximum ($\lambda$max) of the dyes, the mixing weight ratio (%) of the dyes in the recording layers, and the optical constants (refractive index (n) and attenuation coefficient (k)) of the recording layers obtained at each wavelength in Examples 1 through 7 and Comparative Examples 1 through 3. In addition, Table 2 shows characteristics (reflectance, error rate, and degree of modulation of the shortest pit) of the reproduced signal obtained at each wavelength.

TABLE 1

| EXAMPLE | | 1 | 2 | 3 | 4 | 5 | 6 |
|---|---|---|---|---|---|---|---|
| DYE 1. | NK.No | NK3239 | NK3239 | NK3239 | NK467 | NK3 | NK3239 |
| | CHEMICAL FORMULA No | 3 | 3 | 3 | 6 | 8 | 3 |
| | $\lambda$max(nm)*1 | 590 | 590 | 590 | 600 | 610 | 590 |
| 2. | NK.No | NK2929 | NK2929 | NK2929 | NK2627 | NK1456 | NK1456 |
| | CHEMICAL FORMULA No | 4 | 4 | 4 | 7 | 9 | 9 |
| | $\lambda$max(nm) | 730 | 730 | 730 | 740 | 750 | 750 |
| 3. | NK.No | | | NK2014 | NK2014 | NK2014 | NK1666 |
| | CHEMICAL FORMULA No | | | 5 | 5 | 5 | 10 |
| | $\lambda$max(nm) | | | 830 | 830 | 830 | 800 |
| MIXING RATIO OF DYES (wt %) (DYE1:DYE2:DYE3) | | 95:5:0 | 81:19:0 | 90:5:5 | 90:5:5 | 90:5:5 | 85:11:4 |
| OPTICAL CONSTANTS OF RECORDING LAYER | | | | | | | |
| 780nm | n*2 | 2.1 | 2.0 | 2.0 | 2.0 | 2.1 | 2.1 |
| | k*3 | 0.08 | 0.10 | 0.10 | 0.10 | 0.11 | 0.12 |
| 680nm | n | 2.0 | 1.7 | 1.9 | 1.9 | 1.9 | 1.7 |
| | k | 0.17 | 0.24 | 0.18 | 0.19 | 0.22 | 0.19 |
| 635nm | n | 2.5 | 2.4 | 2.5 | 2.5 | 2.6 | 2.5 |
| | k | 0.26 | 0.32 | 0.28 | 0.34 | 0.35 | 0.31 |

*1 $\lambda$max: absorption maximum wavelength
*2 n: refractive index
*3 k: attenuation coefficient

| | | EXAMPLE 7 | COMPARATIVE EXAMPLE | | |
|---|---|---|---|---|---|
| | | | 1 | 2 | 3 |
| DYE 1. | NK.No | NK3 | NK3239 | NK3239 | NK3239 |
| | CHEMICAL FORMULA No | 8 | 3 | 3 | 3 |
| | $\lambda$max (nm) | 610 | 590 | 590 | 590 |
| 2. | NK.No | NK2627 | | NK2929 | |
| | CHEMICAL FORMULA No | 7 | | 4 | |
| | $\lambda$max(nm) | 740 | | 730 | |
| 3. | NK.No | NK1666 | | | NK2014 |
| | CHEMICAL FORMULA No | 10 | | | 5 |
| | $\lambda$max(nm) | 800 | | | 830 |
| MIXING RATIO OF DYES (wt %) (DYE1:DYE2:DYE3) | | 85:4:11 | 100:0:0 | 70:30:0 | 50:0:50 |
| OPTICAL CONSTANTS OF RECORDING LAYER | | | | | |
| 780nm | n *1 | 1.9 | 2.0 | 2.1 | 1.8 |
| | k *2 | 0.13 | 0.03 | 0.09 | 0.21 |
| 680nm | n | 1.8 | 2.1 | 1.8 | 1.7 |
| | k | 0.18 | 0.08 | 0.50 | 0.49 |
| 635nm | n | 2.5 | 2.6 | 2.1 | 1.8 |
| | k | 0.30 | 0.17 | 0.55 | 0.50 |

*1 n: refractive index
*2 k: attenuation coefficient

TABLE 2

| EXAMPLE | | 1 | 2 | 3 | 4 | 5 | 6 | 7 |
|---|---|---|---|---|---|---|---|---|
| 680 RECORDING | 780nm REPRODUCTION | | | | | | | |
| | REFLECTANCE (%) | 70 | 65 | 68 | 67 | 68 | 68 | 65 |
| | ERROR RATE (cps) | <5 | 10 | <5 | <5 | <5 | <5 | 10 |
| | I3/I top | 0.50 | 0.47 | 0.48 | 0.46 | 0.50 | 0.50 | 0.48 |
| | 680nm REPRODUCTION | | | | | | | |
| | REFLECTANCE (%) | 58 | 35 | 57 | 55 | 53 | 45 | 50 |
| | ERROR RATE (cps) | <5 | 15 | <5 | <5 | 7 | <5 | <5 |
| | I3/I top | 0.45 | 0.42 | 0.44 | 0.41 | 0.45 | 0.43 | 0.45 |
| 780 RECORDING | 786nm REPRODUCTION | | | | | | | |
| | REFLECTANCE (%) | 70 | 65 | 69 | 69 | 70 | 69 | 66 |
| | ERROR RATE (cps) | <5 | 15 | <5 | <5 | <5 | <5 | 10 |
| | I3/I top | 0.48 | 0.45 | 0.47 | 0.43 | 0.49 | 0.48 | 0.47 |
| | 680nm REPRODUCTION | | | | | | | |
| | REFLECTANCE (%) | 58 | 36 | 56 | 54 | 51 | 45 | 51 |
| | ERROR RATE (cps) | <5 | 15 | <5 | <5 | <5 | <5 | <5 |
| | I3/I top | 0.47 | 0.40 | 0.44 | 0.40 | 0.48 | 0.44 | 0.45 |
| | 635nm REPRODUCTION | | | | | | | |
| | REFLECTANCE (%) | 28 | 23 | 25 | 28 | 26 | 24 | 25 |
| | ERROR RATE (cps) | <5 | 15 | <5 | <5 | <5 | 10 | <5 |
| | I3/I top | 0.50 | 0.43 | 0.45 | 0.42 | 0.45 | 0.45 | 0.46 |

| | COMPARATIVE EXAMPLE | 1 | 2 | 3 |
|---|---|---|---|---|
| 680 RECORDING | 780nm REPRODUCTION | | | |
| | REFLECTANCE (%) | 72 | 52 | 35 |
| | ERROR RATE (cps) | <5 | 4020 | 5510 |
| | I3/I top | 0.40 | 0.39 | 0.25 |
| | 680nm REPRODUCTION | | | |
| | REFLECTANCE (%) | 62 | 15 | 8 |
| | ERROR RATE (cps) | <5 | 4510 | 7350 |
| | I3/I top | 0.41 | 0.25 | unmeasurable |
| 780 RECORDING | 786nm REPRODUCTION | | | |
| | REFLECTANCE (%) | 73 | 49 | 36 |
| | ERROR RATE (cps) | unrecordable | unreproducible | unreproducible |
| | I3/I top | | | |
| | 680nm REPRODUCTION | | | |
| | REFLECTANCE (%) | 61 | 14 | 8 |
| | ERROR RATE (cps) | unrecordable | 5320 | 7350 |
| | I3/I top | | 0.20 | unmeasurable |
| | 635nm | | | |

TABLE 2-continued

| REPRODUCTION | | | |
|---|---|---|---|
| REFLECTANCE (%) | 31 | 12 | 5 |
| ERROR RATE (cps) | unrecordable | 6550 | 7350 |
| I3/I top | | unmeasurable | unmeasurable |

EXAMPLE 8

As a dye to form a recording layer, 2.2 g of monocarbacyanine dye NK737 (produced by Nippon Kanko Shikiso Kenkyusho KK) represented by the following formula (11) and 0.4 g of phthalocyanine dye (produced by Nippon Kanko Shikiso Kenkyusho KK) represented by the following formula (12) were dissolved into 100 ml of 2,2,3,3-tetrafluoro-1-propanol (produced by Tokyo Kasei KK) to prepare a dye solution.

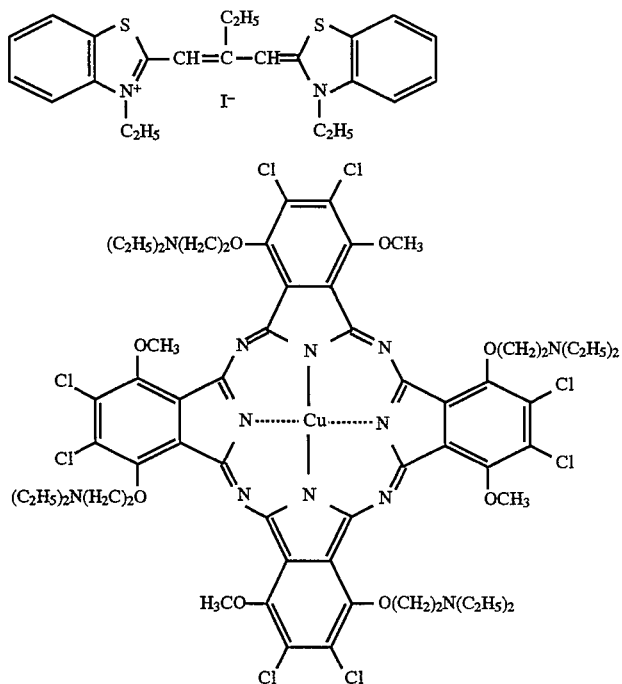

A substrate used was a polycarbonate substrate of a disc shape having a thickness of 1.2 mm and a diameter of 120 mm φ and having a spiral pre-groove formed on its surface with a depth of 130 nm, a width of 0.5 μm, and a pitch of 5 1.6 μm.

The dye solution was coated on the surface of the substrate by spin coating at a rotation rate of 1600 rpm to form a layer. This layer was dried at 70° C. for 2 hours to provide a recording layer. The absorbance of this recording layer were 0.35, 0.27, and 0.23 at the wavelength of 635nm, 680 nm, and 780 nm, respectively. The spectral absorption maximum and the absorbance, at each wavelength, of the recording layer were measured by means of coating the dye solution on a glass substrate by spin coating, and drying it at 70° C. for 2 hours to form a thin film of the dye. The film was then subjected to measurement by using an ultraviolet-visible ray spectrophotometer UV-2200 (available from Shimadzu). The absorbance is a value obtained by taking off the absorption by the substrate.

Then, an Au film was formed by sputtering on this recording layer by using a sputtering device CDI-900 (available from Balzers Co.) to form a reflective layer of 80 nm thick. Sputtering conditions were as follows:

Sputtering power; 2.5 kW

Sputtering gas (argon gas) pressure; $1.0 \times 10^{-2}$ Torr.

An ultraviolet curing resin SD-17 (available from Dainippon Ink Chemicals) was coated on the reflective layer by spin coating, to which an ultraviolet ray was irradiated to form a protective film of 6 μm in thickness.

To the medium obtained, a laser was irradiated at a linear speed of 4.8 m/sec. with a recording power of 10 mW to record information by using an optical disc estimation device DDU-1000 (available from Pulstec Industrial Co., Ltd.) with a laser head for a red semiconductor laser of 680 nm and a CD encoder (available from KENWOOD). After recording, the recorded signal was reproduced by using the same estimation device. As a result, the reflectance was 32% and the error rate was less than 5 cps, when measured by using a CD decoder DR3552 (available from KENWOOD). The degree of modulation of the shortest pit (I3/Itop) was 0.43. Jitter value was measured by using a jitter meter LJM-1851 (available from Leader Electronics Corp.). The result was good.

In addition, the recorded sample was subjected to a reproduction estimation by using an optical disc estimation device (available from Pulstec Industrial Co., Ltd.) with a laser head for a near infrared semiconductor laser capable of providing a reproducing wavelength of 780 nm. As a result, the reflectance was 66%, the error rate was less than 5 cps, and I3/Itop was 0.45. In addition, the signal had small deformation in waveform, and the jitter value was good to satisfy the Orange Book Standards.

On the other hand, to the medium obtained, a laser was irradiated at a linear speed of 1.4 m/sec. with a recording power of 8 mW to record information by using an optical disc estimation device DDU-1000 (available from Pulstec Industrial Co., Ltd.) with a laser head for a near infrared semiconductor laser of 780 nm and a CD encoder (available from KENWOOD). After recording, the recorded signal was reproduced by using a commercially available CD player CDX-1050 (available from YAMAHA) having a reproducing wavelength of 786 nm. As a result, the reflectance was 67%, the error rate was less than 5 cps, and I3/Itop was 0.48. The jitter value was good to satisfy the Orange Book Standards.

In addition, the recorded sample was subjected to a reproduction estimation at a linear speed of 1.4 m/sec by using an optical disc estimation device DDU-1000 (available from Pulstec Industrial Co., Ltd.) with a laser head for a red semiconductor laser capable of providing a reproducing wavelength of 680 nm. As a result, the reflectance was 31%, the error rate was less than 5 cps, and I3/Itop was 0.43. The jitter value was good.

Further, the recorded sample was subjected to a reproduction estimation at a linear speed of 1.4 m/sec by using an optical disc estimation device DDU-1000 (available from Pulstec Industrial Co., Ltd.) with a laser head for a red semiconductor laser capable of providing a reproducing wavelength of 635 nm. As a result, the reflectance was the error rate was less than 5 cps, and I3/Itop was 0.45. The jitter value was good.

The spectral absorption maximum of the dye used was measured by means of coating the dye solution on a glass substrate by spin coating, and drying it at 70° C. for 2 hours to form a thin film of the dye. The film was then subjected to measurement by using an ultraviolet-visible ray spectrophotometer UV-2200 (available from Shimadzu Corporation). As a result, the spectral absorption maximum of NK737 was 570 nm and that of the phthalocyanine dye represented by the formula (12) was 745 nm.

EXAMPLE 9

Example 8 was repeated to produce a medium except that 3.0 g of porphyrin represented by the following formula and 0.5 g of dicarbocyanine dye NK2929 (produced by Nippon Kanko Shikiso Kenkyusho KK) represented by the above formula (4) were dissolved into 100 ml of 2,2,3,3-tetrafluoro-1-propanol to prepare a dye solution, which was then coated by spin coating.

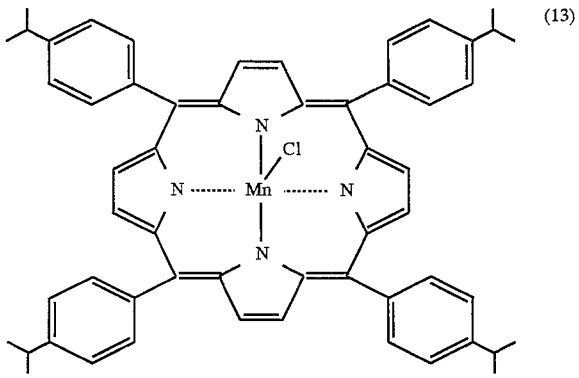

(13)

To the medium obtained, a laser was irradiated at a linear speed of 2.4 m/sec. with a recording power of 7.5 mW to record information by using an optical disc estimation device DDU-1000 (available from Pulstec Industrial Co., Ltd.) with a laser head for a near infrared semiconductor laser of 780 nm and a pulse generator (available from KENWOOD). After recording, the recorded signal was reproduced and estimated by using a commercially available CD player having a reproducing wavelength of 786 nm. As a result, the reproduced signal had small deformation in waveform, which satisfied the Orange Book Standards.

For the medium obtained, the recording and reproduction tests were made as in Example 8. As a result, the reflectance, the degree of modulation, the error rate, and the jitter value were all good at each wavelength.

In addition, the absorbance of the recording at each wavelength layer was measured in the same manner as in Example 8.

EXAMPLE 10

Example 8 was repeated to produce an optical recording medium except that 3.0 g of anthraquinone dye represented by the following formula (14) was used in place of monocarbocyanine dye NK737 (produced by Nippon Kanko Shikiso Kenkyusho KK) represented by the above formula (11).

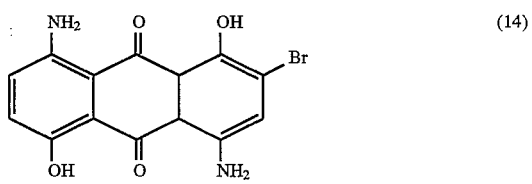

(14)

To the medium obtained, a laser was irradiated at a linear speed of 2.4 m/sec. with a recording power of 8 mW to record information by using an optical disc estimation device DDU-1000 (available from Pulstec Industrial Co., Ltd.) with a laser head for a red semiconductor laser of 680 nm and a pulse generator (available from KENWOOD). The recorded medium was subjected to reproduction estimation in the same manner as in Example 8. The result was good.

To the medium obtained, a laser was irradiated at a linear speed of 2.4 m/sec. with a recording power of 7.5 mW to record information by using an optical disc estimation device DDU-1000 (available from Pulstec Industrial Co., Ltd.) with a laser head for a near infrared semiconductor laser of 780 nm and a pulse generator (available from KENWOOD). The recorded medium was subjected to reproduction estimation in the same manner as in Example 8. As a result, the reproduced signal had small deformation in waveform, which satisfied the Orange Book Standards. In addition, the absorbance of the recording layer at each wavelength was also measured in the same manner as in Example 8.

EXAMPLE 11

Example 8 was repeated to produce a medium except that 2.8 g of azo dye represented by the following formula (15) and 0.65 g of phthalocyanine dye represented. by the following formula (16) were dissolved into 100 ml of 2,2,3,3-tetrafluoro-1-propanol (produced by Tokyo Kasei KK) to prepare a dye solution, which was then coated by spin coating at 1600 rpm.

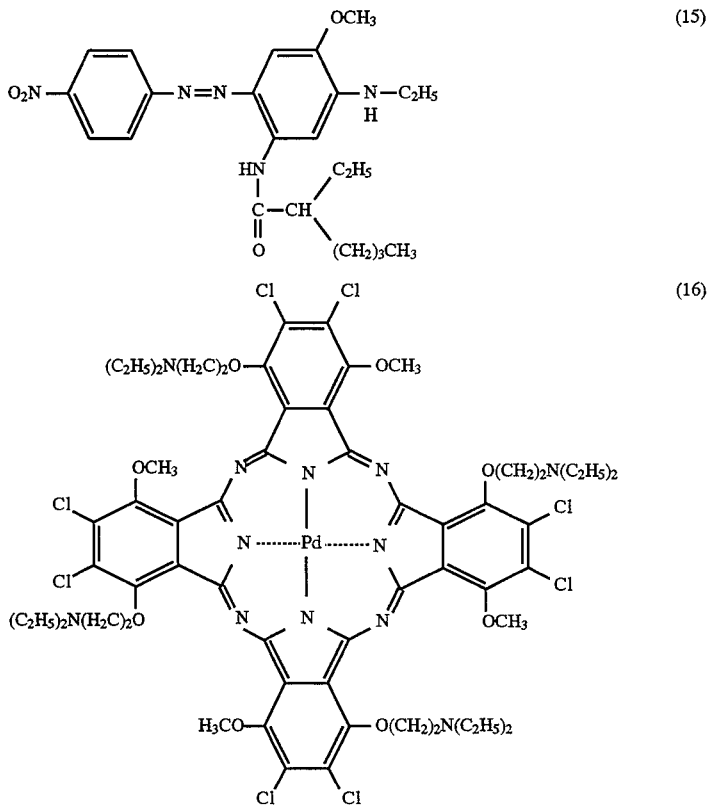

(15)

(16)

For the medium obtained, the recording and reproduction tests were made as in Example 8. As a result, the reflectance, the degree of modulation, the error rate, and the jitter value were all good at each wavelength.

In addition, the absorbance of the recording layer at each wavelength was measured in the same manner as in Example 8.

EXAMPLE 12

Example 8 was repeated to produce a medium except that 2.3 g of tetraazaporphyrin dye represented by the following formula (17) and 0.4 g of phthalocyanine dye represented by the above formula (16) were dissolved into 100 ml of 2,2,3,3-tetrafluoro-1-propanol (produced by Tokyo Kasei KK) to prepare a dye solution, which was then coated by spin coating at 1600 rpm.

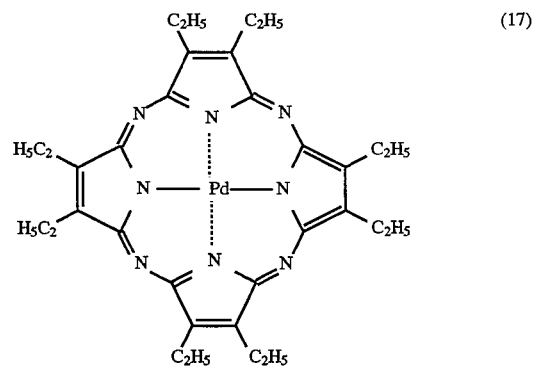

(17)

To the medium obtained, a laser was irradiated at a linear speed of 2.4 m/sec. with a recording power of 8 mW to record information by using an optical disc estimation device DDU-1000 (available from Pulstec Industrial Co., Ltd.) with a laser head for a red semiconductor laser of 680 nm and a pulse generator (available from KENWOOD). The recorded medium was subjected to reproduction estimation in the same manner as in Example 8. The result was good.

To the medium obtained, a laser was irradiated at a linear speed of 1.2 m/sec. with a recording power of 7.0 mW to record information by using an optical disc estimation device DDU-1000 (available from Pulstec Industrial Co., Ltd.) with a laser head for a near infrared semiconductor laser of 780 nm and a pulse generator (available from KENWOOD). The recorded medium was subjected to reproduction estimation in the same manner as in Example 8. As a result, the reproduced signal had small deformation in waveform, which satisfied the Orange Book Standards. In addition, the absorbance of the recording layer at each wavelength was also measured in the same manner as in Example 8.

COMPARATIVE EXAMPLE 4

Example 8 was repeated to produce an optical recording medium except that the dye used was 2.6 g of phthalocyanine dye alone which is represented by the above formula (12).

For the medium obtained, the recording and reproduction tests were made as in Example 8. As a result, it was impossible to obtain good reproduction signal at each wavelength. In particular, the medium could not be played back by using a commercially available CD player having a reproduction wavelength of 786 nm.

In addition, the absorbance of the recording layer were measured in the same manner as in Example 8.

COMPARATIVE EXAMPLE 5

Example 9 was repeated to produce an optical recording medium except that the dye used was 3.0 g of porphyrin dye alone which is represented by the above formula (13).

To the medium obtained, a laser was irradiated at a linear speed of 1.4 m/sec. with a recording power of 11 mW to record information by using an optical disc estimation device DDU-1000 (available from Pulstec Industrial Co., Ltd.) with a laser head for a near infrared semiconductor laser of 780 nm and a pulse generator (available from KENWOOD). As a result, it was impossible to record a signal at a wavelength of 780 nm.

In addition, the absorbance of the recording layer at each wavelength was measured in the same manner as in Example 8.

Table 3 below shows the spectral absorption maximum ($\lambda$max) of the dyes, the mixing weight ratio (%) of the dyes in the recording layers, and the absorbance of the recording layers at each wavelength in Examples 8 through 12 and Comparative Examples 4 and 5. In addition, Table 4 shows characteristics (reflectance, error rate, and degree of modulation) of the reproduced signal obtained at each wavelength.

TABLE 3

| | | EXAMPLE | | | | | COMPARATIVE EXAMPLE | |
|---|---|---|---|---|---|---|---|---|
| | | 8 | 9 | 10 | 11 | 12 | 4 | 5 |
| DYE | 1. CHEMICAL FORMULA No | 11 | 13 | 14 | 15 | 17 | | 13 |
| | $\lambda$max (nm) | 570 | 490 | 610 | 540 | 590 | | 490 |
| | 2. CHEMICAL FORMULA No | 12 | 4 | 12 | 16 | 16 | 12 | |
| | $\lambda$max (nm) | 745 | 730 | 745 | 720 | 720 | 745 | |
| MIXING RATIO OF DYES (wt %) (DYE1:DYE2) | | 85:15 | 86:14 | 88:12 | 81:19 | 85:15 | 0:100 | 100:0 |
| ABSORBANCE OF THE RECORDING LAYER | | | | | | | | |
| 780nm | | 0.23 | 0.05 | 0.18 | 0.10 | 0.11 | 0.31 | 0.02 |
| 680nm | | 0.27 | 0.17 | 0.29 | 0.20 | 0.25 | 0.60 | 0.10 |
| 635nm | | 0.35 | 0.20 | 0.41 | 0.27 | 0.30 | 0.40 | 0.17 |

TABLE 4

| | | EXAMPLE | | | | | COMPARATIVE EXAMPLE | |
|---|---|---|---|---|---|---|---|---|
| | | 8 | 9 | 10 | 11 | 12 | 4 | 5 |
| 680 RECORDING | 780nm REPRODUCTION | | | | | | | |
| | REFLECTANCE (%) | 66 | 71 | 68 | 70 | 69 | 52 | 72 |
| | ERROR RATE (cps) | <5 | <5 | 15 | <5 | <5 | 4500 | <5 |
| | I3/I top | 0.45 | 0.47 | 0.44 | 0.46 | 0.45 | 0.40 | 0.43 |
| | 680nm REPRODUCTION | | | | | | | |
| | REFLECTANCE (%) | 32 | 51 | 27 | 48 | 35 | 8 | 62 |
| | ERROR RATE (cps) | <5 | 15 | 15 | <5 | 8 | 7300 | <5 |
| | I3/I top | 0.43 | 0.44 | 0.38 | 0.43 | 0.42 | unmeasurable | 0.41 |
| 780 RECORDING | 786nm REPRODUCTION | | | | | | | |
| | REFLECTANCE (%) | 67 | 72 | 68 | 71 | 70 | 53 | 73 |
| | ERROR RATE (cps) | <5 | <5 | 10 | <5 | <5 | unreproducible | unrecordable |
| | I3/I top | 0.48 | 0.47 | 0.43 | 0.47 | 0.46 | | |
| | 680nm REPRODUCTION | | | | | | | |
| | REFLECTANCE | 31 | 50 | 26 | 47 | 36 | 8 | 61 |

TABLE 4-continued

| | EXAMPLE | | | | | COMPARATIVE EXAMPLE | |
|---|---|---|---|---|---|---|---|
| | 8 | 9 | 10 | 11 | 12 | 4 | 5 |
| (%) ERROR RATE (cps) | <5 | <5 | 15 | <5 | 9 | 7300 | unrecordable |
| I3/I top | 0.43 | 0.48 | 0.40 | 0.40 | 0.43 | unmeasurable | |
| 635nm REPRODUCTION | | | | | | | |
| REFLECTANCE (%) | 20 | 32 | 17 | 28 | 26 | 6 | 45 |
| ERROR RATE (cps) | <5 | <5 | 15 | <5 | <5 | 5850 | unrecordable |
| I3/I top | 0.45 | 0.47 | 0.45 | 0.44 | 0.45 | unmeasurable | |

EXAMPLE 13

As a dye to form a recording layer, 0.18 g of Ni metal complex of azo dye represented by the following formula (18) and 0.02 g of tricarbocyanine dye represented by the following formula (19) were dissolved into 8 ml of 2,2,3,3,4,4,5,5-octafluoro-1-pentanol (produced by Tokyo Kasei KK) to prepare a dye solution.

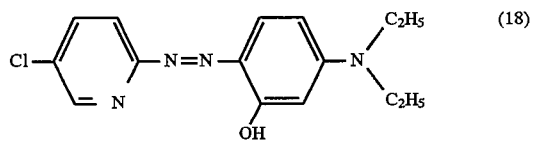

(18)

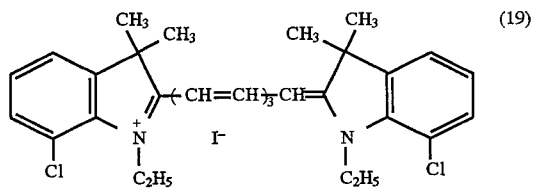

(19)

A substrate used was a polycarbonate substrate of a disc shape having a thickness of 1.2 mm and a diameter of mm$\phi$ and having a spiral pre-groove formed on its surface with a depth of 140 nm, a width of 0.4 µm, and a pitch of 1.2 µm.

The dye solution was coated on the surface of the substrate by spin coating at a rotation rate of 1600 rpm to form a layer. The absorbance of this recording layer were 0.22, 0.18, and 0.13 at the wavelength of 635 nm, 680 nm, and 780 nm, respectively. The spectral absorption maximum and the absorbance, at each wavelength, of the recording layer were measured by means of coating the dye solution on a glass substrate by spin coating, and drying it at 70° C. for 2 hours to form a thin film of the dye. The film was then subjected to measurement by using an ultraviolet-visible ray spectrophotometer UV-2200 (available from Shimadzu). The absorbance is a value obtained by taking off the absorption by the substrate.

Then, an Au film was formed by sputtering on this recording layer by using a sputtering device CDI-900 (available from Balzers Co.) to form a reflective layer of 80 nm thick. Sputtering conditions were as follows:

Sputtering power; 2.5 kW

Sputtering gas (argon gas) pressure; 1.0×10$^{-2}$ Torr.

An ultraviolet curing resin SD-17 (available from Dainippon Ink Chemicals) was coated on the reflective layer by spin coating, to which an ultraviolet ray was irradiated to form a protective film of 5 µm in thickness.

To the medium obtained, a laser was irradiated at a linear speed of 2.8 m/sec. with a recording power of 9 mW to record EFM signals by using an optical disc estimation device DDU-1000 (available from Pulstec Industrial Co., Ltd.) with a laser head for a near infrared semiconductor laser of 780 nm and a CD encoder (available from KENWOOD). After recording, the recorded signal was reproduced at a linear speed of 1.4 m/sec by using the same estimation device. As a result, the reflectance was 70% and the error rate was less than 5 cps, when measured by using a CD decoder DR3552 (available from KENWOOD). The degree of modulation of the shortest pit (I3/Itop) was 0.48. The Jitter value was good to satisfy the Orange Book Standards. In addition, the reproduced waveform had less deformation.

In addition, the recorded sample was subjected to a reproduction estimation at a linear speed of 1.4 m/sec by using an optical disc estimation device DDU-1000 (available from Pulstec Industrial Co., Ltd.) with a laser head for a red semiconductor laser capable of providing a reproducing wavelength of 635 nm. As a result, the reflectance was 30%, the error rate was less than 5 cps, and I3/Itop was 0.50. The recording mode was high-to-low where the reflectance at the recording portion is reduced. The jitter value was very good.

Further, the recorded sample was subjected to a reproduction estimation at a linear speed of 1.4 m/see by using an optical disc estimation device DDU-1000 (available from Pulstec Industrial Co., Ltd.) with a laser head for a red semiconductor laser capable of providing a reproducing wavelength of 680 nm. As a result, the reflectance was 26%, the error rate was less than 5 cps, and I3/Itop was 0.45. The recording mode was high-to-low where the reflectance at the recording portion is reduced. The jitter value was very good.

On the other hand, the medium obtained was subjected to recording and reproduction by using drives having a semiconductor laser of 680 nm and a He—Ne laser of 630 nm, respectively. Good recording and reproduction were achieved. It was confirmed that a good reproduction signal can be obtained from the recorded medium by using a player at 780 nm.

The spectral absorption maximum of the dye used was measured by means of coating the dye solution on a glass substrate by spin coating, and drying it at 70° C. for 2 hours to form a thin film of the dye. The film was then subjected to measurement by using an ultraviolet-visible ray spectrophotometer UV-2200 (available from Shimadzu). As a result, the spectral absorption maximum of the azo dye represented by the formula (18) was 580 nm, while that of the tricarbocyanine dye represented by the formula (19) was 800 nm.

EXAMPLES 14 THROUGH 19

Example 13 was repeated to produce a medium for estimation except that the dye used was a combination of metal complexes of the azo dyes having the absorption maximum at a wavelength shorter than 630 nm, which were represented by the formulae (18), and (20) through (23), and the dye having the absorption maximum at 630–900 nm represented by the formulae (19), and (24) through (26).

Table 5 shows combinations of the dyes, the spectral absorption maximum ($\lambda$max) of each dye, the mixed weight ratio of the dyes (%), and the absorbance of the recording layer at each wavelength.

All media were in a high-to-low recording mode with a large degree of modulation at 780 nm and 635 nm. The error rate and the jitter value were small to provide a good reproduction.

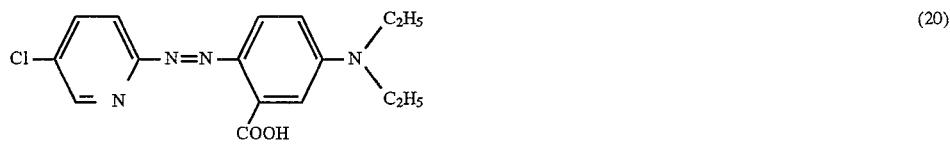

(20)

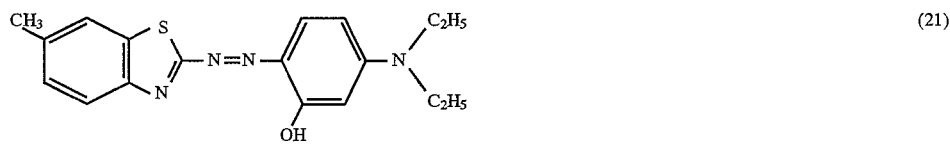

(21)

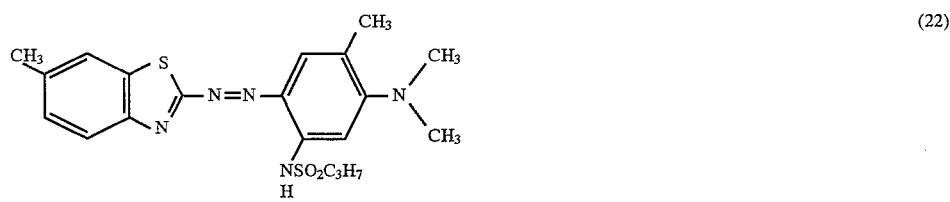

(22)

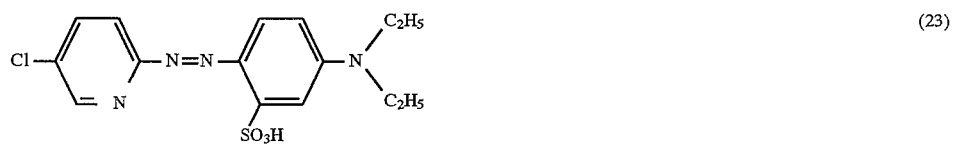

(23)

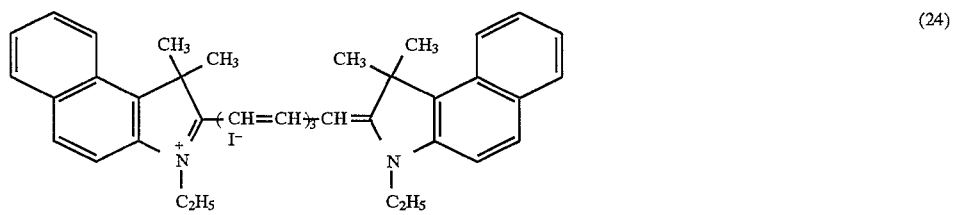

(24)

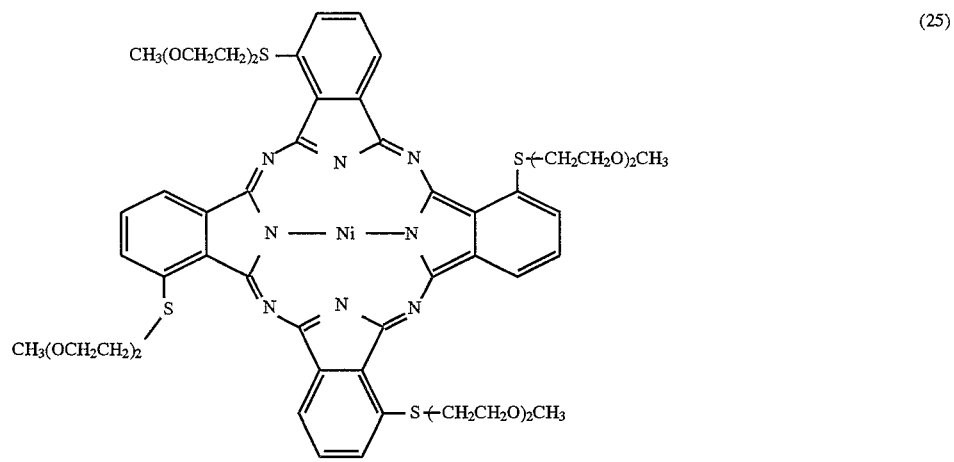

(25)

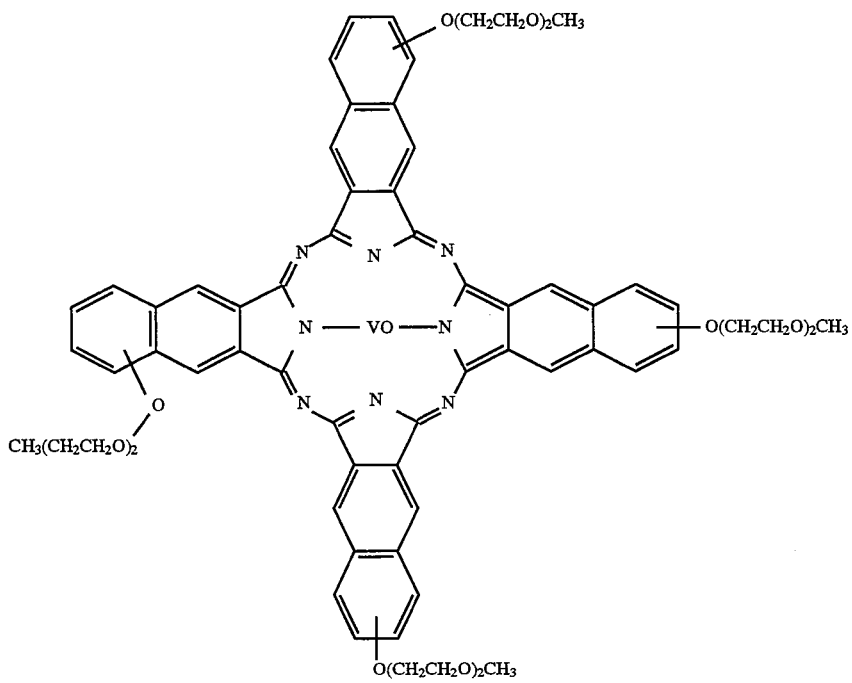

(26)

COMPARATIVE EXAMPLE 6

A medium was produced with a Ni metal complex of the azo compound represented by the formula (18) and following dicarbocyanine dye mixed at a weight ratio of 40:60. The medium was estimated in the same manner as in Example 13.

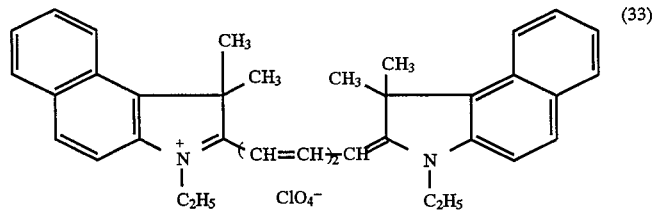

(33)

Recording and reproduction at 780 nm were achieved well. However, reproduction at 635 nm provided the reflectance as small as 9%. In addition, the degree of modulation was too small to achieve reproduction. The spectral absorption maximum of the tricarbocyanine dye in the form of a film was 690 nm. This dye has a large absorption at 600–720 nm.

COMPARATIVE EXAMPLE 7

Comparative Example 6 was repeated to produce a medium except that the Ni metal complex of the azo compound and the dicarbocyanine dye in Comparative Example 6 were mixed at a weight ratio of 25:75.

A non-recorded portion had a reflectance of 30% at a wavelength of 635 nm, while less or no recording could be achieved at 780 nm even when the power was increased to 15 mW.

COMPARATIVE EXAMPLES 8 AND 9

Example 13 was repeated to produce a medium except that the Ni metal complex of the azo dye represented by the formula (18) and the tricarbocyanine dye represented by the formula (19) were used at a varied mixing ratio. Table 5 shows the spectral absorption maximum ($\lambda$max) of each dye, the mixing weight ratio (%) of the dyes, and the absorbance of the recording layer at each wavelength.

No information could be recorded on the medium of Comparative Example 8 at a wavelength of 780 nm with recording power of 15 mW. The medium of Example 9 had a high sensitivity but had a low reflectance at 780 nm. The information thereon thus could not be reproduced with a CD-ROM player.

Table 6 shows characteristics (reflectance, error rate, and degree of modulation of the shortest pit) of the reproduced signals at 780 nm and 635 nm obtained in Examples 13 through 19 and Comparative Examples 6 through 9.

TABLE 5

| | | EXAMPLE | | | | | | | COMPARATIVE EXAMPLE | |
|---|---|---|---|---|---|---|---|---|---|---|
| | | 13 | 14 | 15 | 16 | 17 | 18 | 19 | 8 | 9 |
| DYE | 1. CHEMICAL FORMULA No | 18 | 20 | 21 | 22 | 18 | 23 | 18 | 18 | 22 |
| | METAL | Ni | Co | Ni | Ni | Ni | Pd | Ni | Ni | Ni |
| | λmax (nm) | 580 | 610 | 570 | 600 | 580 | 605 | 580 | 580 | 580 |
| | 2. CHEMICAL FORMULA No | 19 | 19 | 24 | 25 | 26 | 19 | 19 | | 19 |
| | λmax (nm) | 800 | 800 | 820 | 760 | 780 | 800 | 800 | | 800 |
| MIXING RATIO OF DYES (wt %) (DYE1:DYE2) | | 90:10 | 85:15 | 81:19 | 81:19 | 95:5 | 91:9 | 81:19 | 100:0 | 65:35 |
| ABSORBANCE OF THE RECORDING LAYER | | | | | | | | | | |
| | 780nm | 0.13 | 0.18 | 0.11 | 0.18 | 0.08 | 0.19 | 0.23 | 0.02 | 0.31 |
| | 680nm | 0.18 | 0.29 | 0.20 | 0.26 | 0.15 | 0.29 | 0.18 | 0.10 | 0.27 |
| | 635nm | 0.22 | 0.24 | 0.20 | 0.35 | 0.20 | 0.41 | 0.28 | 0.17 | 0.20 |

TABLE 6

| EXAMPLE | | 13 | 14 | 15 | 16 | 17 | 18 | 19 |
|---|---|---|---|---|---|---|---|---|
| 780 RECORDING | 780nm REPRODUCTION | | | | | | | |
| | REFLECTANCE (%) | 70 | 68 | 71 | 68 | 72 | 67 | 66 |
| | ERROR RATE (cps) | <5 | <5 | <5 | 15 | <5 | <5 | <5 |
| | I3/I top | 0.48 | 0.43 | 0.38 | 0.45 | 0.40 | 0.44 | 0.43 |
| | 635nm REPRODUCTION | | | | | | | |
| | REFLECTANCE (%) | 30 | 28 | 32 | 26 | 32 | 19 | 26 |
| | ERROR RATE (cps) | <5 | <5 | <5 | 15 | <5 | 10 | <5 |
| | I3/I top | 0.50 | 0.47 | 0.43 | 0.47 | 0.43 | 0.45 | 0.43 |
| COMPARATIVE EXAMPLE | | 6 | | 7 | | 8 | | 9 |
| 780 RECORDING | 780nm REPRODUCTION | | | | | | | |
| | REFLECTANCE (%) | 75 | | 78 | | 74 | | 60 |
| | ERROR RATE (cps) | <5 | | unrecordable | | unrecordable | | 255 |
| | I3/I top | 0.39 | | | | | | 0.43 |
| | 635nm REPRODUCTION | | | | | | | |
| | REFLECTANCE (%) | 9 | | 30 | | 37 | | 35 |
| | ERROR RATE (cps) | 4500 | | unrecordable | | unrecordable | | 10 |
| | I3/I top | unmeasurable | | | | | | 0.47 |

EXAMPLE 20

Dissolved into 10 ml of 1.2-dimethylcyclohexane (produced by Tokyo Kasei KK) to prepare a dye solution was 0.2 g of Pd.phthalocyanine having one 1-isopropyl-isoamyloxy group at α-positions of four benzene rings forming phthalocyanine represented by the following formula (27), in which illustrated is a typical isomer though there are various isomers depending on combinations of α-positions substituted by a substituent.

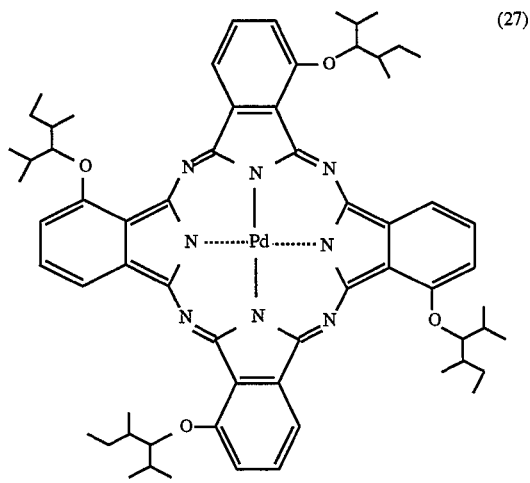

(27)

A substrate used was a polycarbonate substrate of a disc shape having a thickness of 1.2 mm and a diameter of 120 mmφ and having a spiral pre-groove formed on its surface with a depth of 140 nm, a width of 0.4 μm, and a pitch of 1.6 μm.

The dye solution was coated on the surface of the substrate by spin coating at a rotation rate of 1500 rpm to form a layer. This layer was dried at 70° C. for 2 hours to provide a recording film of 120 nm. For the optical constants of this recording film, the refractive index and the attenuation coefficient were 2.0 and 0.05, respectively, at 780 nm, while the refractive index and the attenuation coefficient were 1.15 and 0.36 at 635 nm. On this recording layer, an $Si_3N_4$ film (light interference layer) of 85nm thick was formed by means of reaction sputtering with a sputtering device CFS-4EP (available from Shibaura Engineering Works Co., Ltd.). The refractive index of this thin film was 1.84 at both wavelengths of 780nm and 635 nm. Accordingly, the product of the refractive index and the film thickness (ni×di) of this interference layer at both wavelengths is equal to 156.

Then, an Au film of 100 nm thick was formed by sputtering on this $Si_3N_4$ film by using a sputtering device CDI-900 (available from Balzers Co.) to form a reflective layer. An ultraviolet curing resin SD-17 (available from Dainippon Ink Chemicals) was coated on the reflective layer by spin coating, to which an ultraviolet ray was irradiated to form a protective layer of 6 μm in thickness. The optical recording medium was thus completed.

To the optical recording medium obtained, a laser was irradiated at a linear speed of 2.8 m/sec. with a recording power of 8 mW to record EFM signals by using a writer CCD-521 (available from Phillips Co.) with a laser head for a semiconductor laser of 780 nm. After recording, the recorded signal was reproduced by using a commercially available CD player (YAMAHA CDX-1050; laser wavelength 786 nm) and the characteristics of the reproduced signal were estimated. As a result, the reflectance was 71%, the error rate was less than 5 cps, and I3/Itop was 0.45. The recording mode was high-to-low, and the reproduced signal had less deformation. The jitter value was very good, and thus the Orange Book Standards was satisfied.

Next, the signal recorded by the writer (CDD-521) was reproduced and estimated at a linear speed of 1.4 m/sec by using an optical disc estimation device DDU-1000 (available from Pulstec Industrial Co., Ltd.) with a laser head for a red semiconductor laser of 635 nm. As a result, the reflectance was 22%, and I3/Itop was 0.48. The reproduced signal had less deformation, and the jitter value as well as error rate were very good.

EXAMPLE 21

Example 20 was repeated to produce a medium except that the dye used was Pd.phthalocyanine having one 1-isopropyl-isoamyloxy group at α-positions of four benzene rings forming phthalocyanine with addition of 3.5 bromines on average per pd-phthalocyanine molecule, which is represented by the following formula (28), and that an AlN light interference layer of 100 nm was formed.

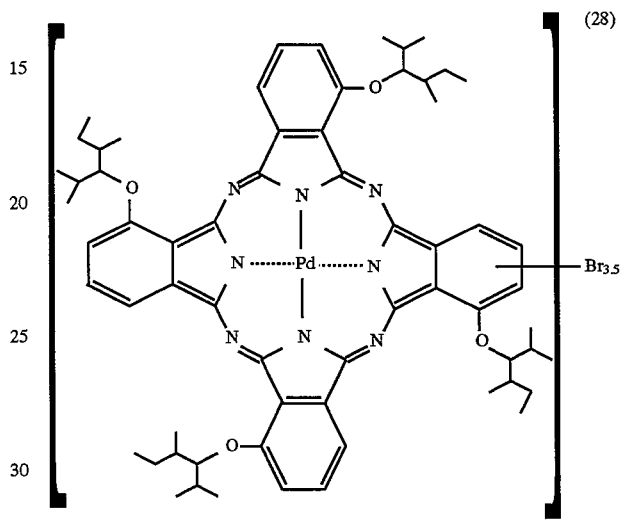

(28)

The optical constants of this recording film was as follows: the refractive index and the attenuation coefficient were 2.2 and 0.08, respectively, at 780 nm; the refractive index and the attenuation coefficient were 1.2 and 0.49, respectively, at 680 nm; and n and k were 1.2 and 0.34, respectively, at 635 nm.

The refractive index of the light interference layer was 1.95 at the wavelengths of 780, 680, and 635 nm, while the product of the refractive index and the film thickness (ni×di) of the light interference layer at each wavelength was 195.

Next, this medium was subjected to recording and reproduction estimation with a laser power of 8 mW in the same manner as in Example 20. More specifically, the medium was reproduced by using a commercially available CD player. As a result, all characteristics satisfied the Orange Book Standards, providing good reproduction. The medium was also subjected to estimation by using an optical disc estimation device DDU-1000 (available from Pulstec Industrial Co., Ltd.) with a red semiconductor laser head for 635 nm. As a result, the reflectance was 25% and I3/Itop was 0.47. The reproduced signal had less deformation in waveform, and the jitter value as well as error rate were very good.

The recorded sample was estimated by using the optical disc estimation device DDU-1000 (available from Pulstec Industrial Co., Ltd.) with a red semiconductor laser head for 680 nm. As a result, the reflectance was 26%, the error rate was lower than 5 cps, and I3/Itop was 0.50 with the recording mode being high-to-low. The jitter value was very good.

On the other hand, the medium obtained was subjected to recording and reproduction by using a drive with a semiconductor laser of 680 nm and a drive with a He—Ne laser of 630nm. Satisfactory level of recording and reproduction were achieved with both drives. In addition, it was confirmed that the recorded medium can provide a good reproduction signal when played back by using a player for a wavelength of 780 nm.

EXAMPLE 22

Example 20 was repeated to produce and estimate a medium except that the dye used in Example 20 was replaced with Ni-phthalocyanine dye having one octhylthio group at α-positions of four benzene rings forming phthalocyanine represented by the following formula (29), in which illustrated is a typical isomer though there are various isomers depending on combinations of α-position substituted by a substituent, and that a $ZrO_2$ light interference layer of 105 nm was formed rather than the $Si_3N_4$ light interference layer.

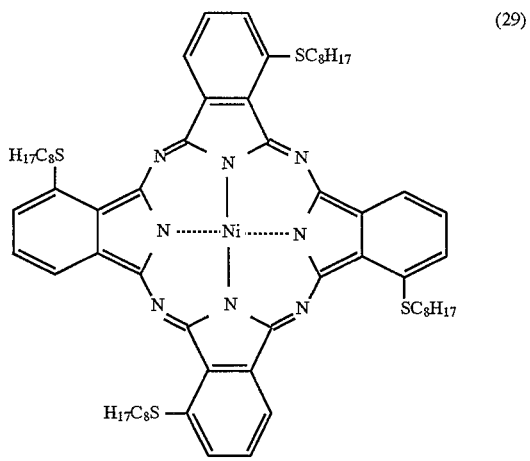

(29)

For the optical constants of this recording film, the refractive index and the attenuation coefficient were 2.3 and 0.12, respectively at 780 nm, while the refractive index and the attenuation coefficient were 1.2 and 0.30, respectively, at 635 nm.

The refractive index of the light interference layer was 2.21 at both wavelengths, while the product of the refractive index and the film thickness (ni×di) of this interference layer at both wavelengths was 232.

Next, to the optical recording medium obtained, a laser was irradiated with a recording power of 12 mW for recording and reproduction as in Example 20. As a result, all characteristics obtained by reproduction with a commercially available CD player satisfied the Orange Book Standards, providing good reproduction.

The signal was reproduced and estimated by using an optical disc estimation device DDU-1000 (available from Pulstec Industrial Co., Ltd.) with a laser head for a red semiconductor laser of 635 nm. As a result, the reflectance was 27%, and I3/Itop was 0.50. The reproduced signal had less deformation, and the jitter value as well as error rate were very good.

COMPARATIVE EXAMPLE 10

Example 20 was repeated to produce an optical recording medium except that the light interference layer was not provided thereon. An EFM signal was recorded on the medium obtained by using a writer available from Phillips Co. with a semiconductor laser head for 780 nm in the same manner as in Example 20. The recorded signal was reproduced for estimation by using a CDX-1050 with a semiconductor laser head for 786nm and DDU-1000 with a semiconductor laser head for 635 nm. As a result, the CDX-1050 provided the reproduction that satisfied the Orange Book Standards. On the other hand, the reflectance was 10% or lower and no reproduced waveform was read with DDU-1000.

COMPARATIVE EXAMPLE 11

Example 21 was repeated to produce two optical recording media except that the film thickness of the light interference layers were 45 nm and 165 nm, respectively. The product of the refractive index and the film thickness was 87.8 for the medium with the light interference layer of 45 nm thick. The reflectance was as low as 12% when reproduced by using an estimator mounting a laser of 635 nm. It was thus impossible to reproduce the recorded signal. In addition, the error rate and the jitter value were too large to prevent the reproduction. On the other hand, the product of the refractive index and the film thickness was 321.8 for the medium with the light interference layer of 165 nm thick. The reflectance and the degree of modulation were small so as not to satisfy the Orange Book Standards when reproduced by a commercially available CD player with recording laser power of 18 mW.

EXAMPLE 23

Example 21 was repeated to produce a recording film by using the Pd.phthalocyanine dye represented by the formula (28). The recording layer had a film thickness of 150 nm. The optical constants of this recording layer were as follows: the refractive index and the attenuation coefficient were 2.2 and 0.08, respectively, with a light beam having a wavelength of 780 nm, and the refractive index and the attenuation coefficient were 1.2 and 0.49, respectively, with a light beam having a wavelength of 680 nm, and the refractive index and the attenuation coefficient were 1.2 and 0.34, respectively, with a light beam having a wavelength of 635 nm.

A substrate used was a polycarbonate substrate of a disc shape having a thickness of 1.2 mm and a diameter of 120 mmφ and having a spiral pre-groove formed on its surface with a depth of 140 nm, a width of 0.4 μm, and a pitch of 1.2 μm.

A 3%-methylcellosolve solution of vinylpyrrolidonevinyl acetate copolymer resin was coated on the recording layer by spin coating as a light interference layer. This layer was dried at 70° C. for 2 hours. The film thickness di of the light interference layer was 120 nm. The refractive index ni of this polymer was 1.45 for both the light beams having wavelengths of 780 nm and 635 nm, and ni×di was 174 for both wavelengths.

Next, a metal film of 80 nm thick was deposited on this light interference layer as a reflective layer by means of sputtering.

Further, an ultraviolet curing resin (SD-17, available from Dainippon Ink Chemicals) was coated on the reflective layer by spin coating, to which an ultraviolet ray was irradiated to form a protective layer of 5 μm in thickness and thereby produce an optical recording medium.

To the medium obtained, a laser was irradiated at a linear speed of 2.8 m/sec. with a recording power of 8 mW to record EFM signals by using a writer CDD-521 (available from Phillips Co.) with a laser head for a semiconductor laser of 780 nm. After recording, the recorded signal was reproduced at a linear speed of 1.4 m/sec by using the same estimation device for estimation of the characteristics. As a result, the reflectance was 71% and the error rate was less than 5 cps. I3/Itop was 0.45. The recording mode was high-to-low mode and the reproduced signal had less deformation in waveform. The jitter value was very good and the Orange Book Standards was satisfied.

Next, the recorded medium was subjected to signal reproduction at a linear speed of 1.4 m/sec by using a player for high-density which has a semiconductor laser of 635 nm. The reflectance was 24% with a large degree of modulation. The recording mode was high-to-low recording at which the reflectance at the recorded portion is decreased. In addition, the error rate and the jitter value were small, providing good reproduction.

Further, the medium was played back by using a player having a semiconductor laser of 680nm. The reflectance was 21%, the recording mode was high-to-low recording with a large degree of modulation. The error rate and the jitter value were small, providing good reproduction. In addition, this medium permits good recording when a signal was recorded with the light beam of 680 nm at a linear speed of 8.4 m/sec. with a recording power of 8.0 mW.

EXAMPLE 24

Example 23 was repeated to produce a medium except that the film thickness of the light interference layer was 160 nm.

The product of the refractive index and the film thickness, i.e., ni×di, of the light interference layer was 232 for both wavelengths of 635 nm and 780 nm.

Next, this medium was subjected to recording and reproduction estimation in the same manner as in Example 23. As a result, the reflectance was 68%, the error rate was less than 5 cps, and I3/Itop was 0.47 at 780 nm. In addition, the jitter value was small and the reproduced signal had less deformation in waveform, permitting good recording and reproduction. In addition, the signal recorded on this medium could readily be reproduced through a commercially available CD player. In addition, when reproduced at 635 nm, the reflectance was 27%, the I3/Itop was 0.48, and the recording mode was high-to-low. In addition, the error rate and the jitter value were extremely small, permitting good reproduction.

EXAMPLE 25

Example 23 was repeated to produce a medium except that the dye used was Cu-phthalocyanine dye having one 1-isopropyl-isoamyloxy group at α-positions of four benzene rings forming phthalocyanine represented by the following formula (30), in which illustrated is a typical isomer though there are various isomers depending on combinations of α-positions substituted by a substituent, and that an alcohol solution of polysiloxane was used as the light interference layer having a film thickness di of 120 nm.

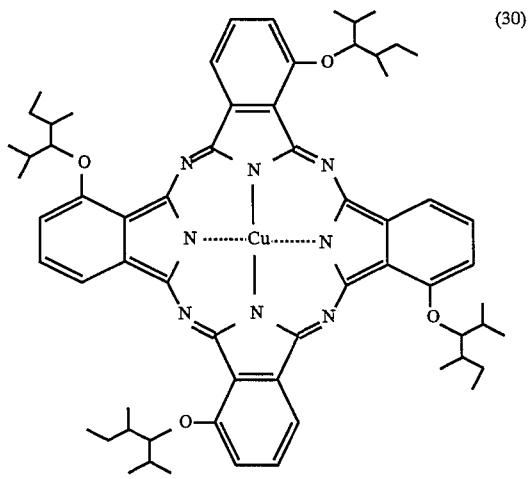

(30)

For the optical constants of this recording film of the medium, the refractive index and the attenuation coefficient were 2.0 and 0.06, respectively, with a light beam having a wavelength of 780 nm, while the refractive index and the attenuation coefficient were 1.2 and 0.30 with a light beam having a wavelength of 635 nm. The refractive index ni of the light interference layer was 1.40 for both wavelengths of 780 nm and 635 nm. Accordingly, the product of the refractive index and the film thickness (ni×di) of this interference layer at both wavelengths was 168.

Next, this medium was subjected to recording and reproduction estimation in the same manner as in Example 23. As a result, the reflectance was 67%, the error rate was less than 5 cps, and I3/Itop was 0.43 at 780 nm. In addition, the jitter value was small and the reproduced signal had less deformation in waveform, permitting good recording and reproduction. In addition, the signal recorded on this medium could readily be reproduced through a commercially available CD player. In addition, when reproduced at 635 nm, the reflectance was 30%, the I3/Itop was 0.47, and the recording mode was high-to-low. In addition, the error rate and the jitter value were extremely small, permitting good reproduction.

EXAMPLE 26

Example 23 was repeated to produce a medium except that Ni-phthalocyanine dye represented by the above formula (29) was used.

For the optical constants of this recording film of the medium, the refractive index and the attenuation coefficient were 2.3 and 0.12, respectively, with a light beam having a wavelength of 780 nm, while the refractive index and the attenuation coefficient were 1.2 and 0.30 with a light beam having a wavelength of 635 nm.

This medium was subjected to recording and reproduction estimation in the same manner as in Example 23. As a result, the reflectance was 66%, the error rate was less than 5 cps, and I3/Itop was 0.42 at 780 nm. In addition, the jitter value was small and the reproduced signal had less deformation in waveform, permitting good recording and reproduction. In addition, the signal recorded on this medium could readily be reproduced through a commercially available CD player. In addition, when reproduced at 635 nm, the reflectance was 26%, the I3/Itop was 0.39, and the recording mode was high-to-low. In addition, the error rate and the jitter value were extremely small, permitting good reproduction.

COMPARATIVE EXAMPLES 12 AND 13

Example 23 was repeated to produce and estimate media with the light interference layers of 60 nm (Comparative Example 12) and 230 nm (Comparative Example 13) in thickness.

In the light interference layer of the medium according to Comparative Example 12, the product of the refractive index and the film thickness, i.e., ni×di, was 87. The reflectance at the wavelength of 635 nm was 9%. The recording mode was low-to-high mode with a small degree of modulation. This medium thus could not be played back by a player for high density. On the other hand, the light interference layer of the medium according to Comparative Example 13 had ni×di of 334. The reflectance at the wavelength of 780 nm was 55%. This medium could not be played back by using a commercially available CD player.

COMPARATIVE EXAMPLE 14

Example 23 was repeated to produce and estimate a medium having a recording layer of 160 nm thick by using a tricarbocyanine dye NK3219 (Nippon Kanko Shikiso Kenkyusho KK) and a silicone resin light interference layer of 140 nm thick formed thereon.

For the optical constants of this recording layer, the refractive index was 2.6, and the attenuation coefficient was 0.11 at the wavelength of 780 nm. The refractive index and the attenuation coefficient were 1.9 and 1.31, respectively, at 680 nm while the refractive index and the attenuation coefficient were 1.09 and 1.21, respectively, at 635 nm. In addition, the refractive index of the light interference layer ni was 1.40 at each wavelength of 780 nm, 680 nm and 635 nm. Therefore the product of the refractive index and the film thickness (ni×di) was 196.

Next, this medium was subjected to recording and reproduction estimation in the same manner as in Example 28. As a result, the reflectance was 71%, the error rate was less than 5 cps, and the degree of modulation was sufficiently large at 780 nm. In addition, the jitter value was small and the reproduced signal had less deformation in waveform, permitting good recording and reproduction. In addition, the recorded signal on this medium could readily be reproduced through a commercially available CD player. However, when the medium recorded at 780 nm was reproduced at 680 nm and 635 nm, the reflectance was 8% and 9%, respectively and the recording mode was low to high. In addition, the degree of modulation was low, and thus reproduction was difficult.

EXAMPLE 27

0.2 G of Ni metal complex of the azo dye represented by the formula (18) was dissolved into 10 ml of 2,2,3,3-tetrafluoro-1-propanol (produced by Tokyo Kasei KK) to prepare a dye solution 1.

A substrate used was a polycarbonate substrate of a disc shape having a thickness of 1.2 mm and a diameter of 120 mmφ and having a spiral pre-groove formed on its surface with a depth of 170 nm, a width of 0.5 µm, and a pitch of 1.6 µm.

The dye solution 1 was coated on the surface of the substrate by spin coating at a rotation rate of 1500 rpm to form a layer. This layer was dried at 70° C. for 2 hours to provide a light interference layer having a film thickness of 80 nm. For the optical constants of this light interference layer, the refractive index (the real part of the complex refractive index) was 1.9, and the attenuation coefficient (the imaginary part of the complex refractive index) was 0.05 at the wavelength of 780 nm. The refractive index and the attenuation coefficient were 2.1 and 0.04, respectively, at 680 nm while the refractive index and the attenuation coefficient were 2.5 and 0.10, respectively, at 635 nm. The product of the refractive index and the film thickness (ni×di) at 780 nm, 680 nm, and 635 nm is thus 152, 168, and 200, respectively.

A dye solution 2, obtained by dissolving 0.25 g of phthalocyanine dye represented by the formula (31) into 10 ml of 1,2-dimethylcyclohexane, was coated on the light interference layer by spin coating at a rotation speed of 1600 rpm. This solution was dried at 70° C. for 2 hours to form a recording layer. For the optical constants of this recording layer, the refractive index and the attenuation coefficient were 2.2 and 0.08, respectively, at 780 nm, the refractive index and the attenuation coefficient were 1.2 and 0.49, respectively, at 680 nm, and the refractive index and the attenuation coefficient were 1.1 and 0.34, respectively, at 635 nm.

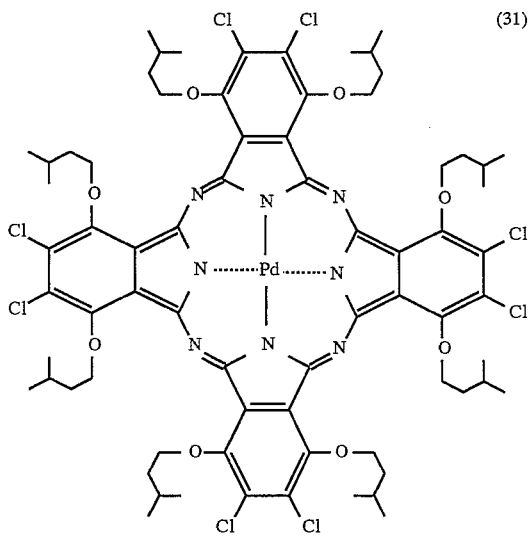

Then, an Au film was formed by sputtering on this recording layer by using a sputtering device CDI-900 (available from Balzers Co.) to form a reflective layer of 100 nm thick. An ultraviolet curing resin SD-17 (available from Dainippon Ink Chemicals) was coated on the reflective layer by spin coating, to which an ultraviolet ray was irradiated to form a protective layer of 6 µm in thickness.

To the optical recording medium obtained, a laser was irradiated at a linear speed of 2.8 m/sec. with a recording power of 8 mW to record EFM signals by using a writer CCD-521 (available from Phillips Co.) with a laser head for a semiconductor laser of 780 nm. After recording, the recorded signal was reproduced by using a commercially available CD player (YAMAHA CDX-1050; laser wavelength 786 nm) to measure the reflectance, the error rate, and I3/Itop. As a result, the reproduced waveform had less deformation that satisfies the Orange Book Standards. Next, the recorded signal was reproduced and estimated by using an optical disc estimation device DDU-1000 (available from Pulstec Industrial Co., Ltd.) with a laser head for a red semiconductor lasers of 680 nm and 635 nm to measure the reflectance, the error rate, and the degree of modulation (IS/Itop). The results were good.

To the optical recording medium obtained, a laser was irradiated at a linear speed of 5.6 m/sec. with a recording power of 10 mW to record EFM signals by using an optical disc estimation device DDU-1000 (available from Pulstec Industrial Co., Ltd.) with a laser head for a red semiconductor laser of 680 nm and EFM encoder (available from KENWOOD). After recording, the recorded signal was reproduced by using an estimation device with red semiconductor laser heads for 680 nm and 635 nm to measure the reflectance, the error rate, and I3/Itop. The results were good. This recorded medium was played back by a commercially available CD player (YAMAHA CDX-1050; laser wavelength 786 nm) to reproduce the signal recorded with the drive (DDU-1000) at 680 nm. The reflectance, the error rate, and I3/Itop were then measured. The results were good values satisfying the Orange Book Standards.

EXAMPLE 28

Example 27 was repeated to produce an optical recording medium except that the order of coating was reversed, i.e., the phthalocyanine dye (formula (31)) was applied as the recording layer, and on which the azo dye (Ni metal complex of formula (18)) was coated as the light interference layer.

The medium obtained was subjected to recording and reproduction estimation in the same manner as in Example 27. The results were good in respect to the recording characteristics at each wavelength.

EXAMPLE 29

Example 27 was repeated to produce an optical recording medium except that 0.2 g of azo dye represented by the following formula (32) was used for the light interference layer. The film thickness of the light interference layer was 100 nm. For the optical constants of this light interference layer, the refractive index and the attenuation coefficient were 1.8 and 0.06, respectively, at 780 nm, the refractive index and the attenuation coefficient were 2.0 and 0.05, respectively, at 680 nm, and the refractive index and the attenuation coefficient were 2.3 and 0.09, respectively, at 635 nm. The product of the refractive index and the film thickness (ni×di) at 780 nm, 680 nm, and 635 nm is thus 180, 200, and 230, respectively.

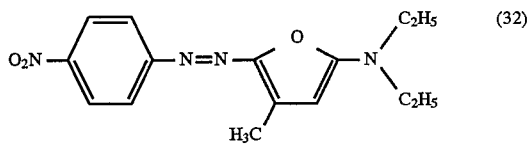

The medium obtained was subjected to recording and reproduction estimation in the same manner as in Example 27. As a result, the recording characteristics were good at each wavelength.

EXAMPLE 30

Example 29 was repeated to produce an optical recording medium except that the order of application was reversed, i.e., the phthalocyanine dye (formula (31)) was applied as the recording layer, on which the azo dye (formula (32)) was coated as the light interference layer.

The medium obtained was subjected to recording and reproduction estimation in the same manner as in Example 27. As a result, the recording characteristics were good at each wavelength.

EXAMPLES 31 THROUGH 37

Example 28 was repeated to produce a medium with the light interference layer for estimation except that the dye used was a combination of metal complexes of the azo dyes, which were represented by the formulae (18), and (20) through (23), and the phthalocyanine dyes represented by the formulae (28) through (31). Table 7 shows combinations of the dyes, the optical constants (refractive index (n) and attenuation coefficient (k)) of the recording and light interference layers at 780, 680, and 635 nm, the film thickness (d) of the light interference layer, and the product of the refractive index and the film thickness, i.e., ni×di.

All media were in a high-to-low recording mode with a large degree of modulation at 780 nm, 680 nm, and 635 nm. The error rate and the jitter value were small to provide good reproduction.

TABLE 7

| EXAMPLE | | 31 | 32 | 33 | 34 | 35 | 36 | 37 |
|---|---|---|---|---|---|---|---|---|
| RECORDING LAYER | CHEMICAL FORMULA No | 28 | 29 | 30 | 31 | 28 | 28 | 31 |
| INTERFERENCE LAYER | CHEMICAL FORMULA No | 18 | 20 | 21 | 22 | 23 | 18 | 22 |
| | METAL | Ni | Co | Ni | Ni | Pd | Ni | Ni |
| | THICKNESS OF FILM (nm) | 80 | 90 | 90 | 80 | 75 | 100 | 60 |
| OPTICAL CONSTANTS RECORDING LAYER | | | | | | | | |
| 780nm | n *1 | 2.2 | 2.3 | 2.0 | 2.2 | 2.2 | 2.2 | 2.2 |
| | k *2 | 0.08 | 0.12 | 0.06 | 0.10 | 0.08 | 0.08 | 0.10 |
| 680nm | n | 1.2 | 1.3 | 1.3 | 1.2 | 1.2 | 1.2 | 1.2 |
| | k | 0.49 | 0.51 | 0.47 | 0.45 | 0.49 | 0.49 | 0.45 |
| 635nm | n | 1.2 | 1.2 | 1.2 | 1.1 | 1.2 | 1.2 | 1.1 |
| | k | 0.34 | 0.30 | 0.30 | 0.28 | 0.34 | 0.34 | 0.28 |
| INTERFERENCE LAYER | | | | | | | | |
| 780nm | n | 1.9 | 1.8 | 1.9 | 1.9 | 1.9 | 1.9 | 1.9 |
| | k | 0.05 | 0.10 | 0.10 | 0.11 | 0.12 | 0.05 | 0.11 |
| 680nm | n | 2.1 | 1.9 | 2.0 | 2.0 | 2.1 | 2.1 | 2.0 |
| | k | 0.04 | 0.08 | 0.10 | 0.10 | 0.12 | 0.04 | 0.10 |
| 635nm | n | 2.5 | 2.4 | 2.4 | 2.5 | 2.6 | 2.5 | 2.5 |
| | k | 0.10 | 0.11 | 0.12 | 0.13 | 0.14 | 0.10 | 0.13 |
| ni × di *3 | 780nm | 152 | 162 | 171 | 152 | 143 | 190 | 114 |
| | 680nm | 168 | 171 | 180 | 160 | 158 | 210 | 120 |
| | 635nm | 200 | 216 | 216 | 200 | 195 | 250 | 150 |

*1 n: refractive index
*2 k: attenuation coefficient
*3: refractive index × film thickness of interference layer

COMPARATIVE EXAMPLE 15

Example 27 was repeated to produce an optical recording medium except that the film thickness of the azo dye of the light interference layer was changed to 35 nm. The product of the refractive index and the film thickness (ni×di) at 780, 680, and 635 nm were 64, 74, and 88, respectively.

The medium obtained was estimated in the same manner as in Example 27. As a result, the reproduced signal had a waveform with deformation at 680 and 635 nm. In addition, the reflectance was low.

COMPARATIVE EXAMPLE 16

Example 27 was repeated to produce an optical recording medium except that the film thickness of the azo dye of the light interference layer was changed to 160 nm. The product of the refractive index and the film thickness (ni×di) at 780, 680, and 635 nm were 304, 336, and 400, respectively.

The medium obtained was estimated in the same manner as in Example 27. As a result, the reproduced signal had a waveform with deformation at 786, 680 and 635 nm. In addition, the reflectance was low.

COMPARATIVE EXAMPLE 17

Example 28 was repeated to produce an optical recording medium except that only the recording layer was applied.

The medium obtained was estimated in the same manner as in Example 27. As a result, the reproduced signal had a waveform with deformation at 680 and 635 nm. In addition, the reflectance was low.

Table 8 shows the characteristics (reflectance, error rate, and degree of modulation) of the reproduced signal obtained at wavelengths of 786, 680, and 635 nm for cases where the signals were recorded at 780 and 680 nm in Examples 27 through 37 and Comparative Examples 15 through 17.

TABLE 8

| EXAMPLE | | | 27 | 28 | 29 | 30 | 31 | 32 | 33 | 34 |
|---|---|---|---|---|---|---|---|---|---|---|
| 680 RE- | 786nm REPRODUCTION | | | | | | | | | |
| CORDING | REFLECTANCE (%) | | 70 | 69 | 69 | 70 | 69 | 66 | 70 | 67 |
| | ERROR RATE (cps) | | 8 | 7 | <5 | <5 | <5 | <5 | <5 | <5 |
| | I3/I top | | 0.42 | 0.41 | 0.42 | 0.46 | 0.45 | 0.40 | 0.45 | 0.42 |
| | 680nm REPRODUCTION | | | | | | | | | |
| | REFLECTANCE (%) | | 27 | 28 | 29 | 30 | 28 | 21 | 33 | 26 |
| | ERROR RATE (cps) | | 10 | 7 | 6 | <5 | <5 | 10 | <5 | <5 |
| | I3/I top | | 0.38 | 0.40 | 0.39 | 0.43 | 0.42 | 0.37 | 0.43 | 0.39 |
| | 635nm REPRODUCTION | | | | | | | | | |
| | REFLECTANCE (%) | | 33 | 31 | 33 | 34 | 31 | 24 | 32 | 28 |
| | ERROR RATE (cps) | | 7 | 5 | 7 | <5 | <5 | 7 | <5 | <5 |
| | I3/I top | | 0.45 | 0.47 | 0.43 | 0.47 | 0.45 | 0.43 | 0.45 | 0.44 |
| 780 RE- | 786nm REPRODUCTION | | | | | | | | | |
| CORDING | REFLECTANCE (%) | | 71 | 68 | 70 | 69 | 70 | 66 | 70 | 66 |
| | ERROR RATE (cps) | | 6 | 7 | 6 | <5 | <5 | 6 | <5 | <5 |
| | I3/I top | | 0.45 | 0.42 | 0.40 | 0.47 | 0.45 | 0.40 | 0.46 | 0.44 |
| | 680nm REPRODUCTION | | | | | | | | | |
| | REFLECTANCE (%) | | 28 | 27 | 27 | 29 | 29 | 20 | 31 | 26 |
| | ERROR RATE (cps) | | 9 | 10 | 8 | <5 | 9 | 8 | <5 | 10 |
| | I3/I top | | 0.39 | 0.45 | 0.42 | 0.44 | 0.43 | 0.39 | 0.44 | 0.42 |
| | 635nm REPRODUCTION | | | | | | | | | |
| | REFLECTANCE (%) | | 35 | 33 | 32 | 33 | 31 | 23 | 32 | 28 |
| | ERROR RATE (cps) | | 8 | 9 | 7 | <5 | <5 | 7 | <5 | <5 |
| | I3/I top | | 0.44 | 0.47 | 0.43 | 0.47 | 0.45 | 0.45 | 0.47 | 0.45 |

TABLE 8-continued

| | | EXAMPLE | | | COMPARATIVE EXAMPLE | | |
|---|---|---|---|---|---|---|---|
| | | 35 | 36 | 37 | 15 | 16 | 17 |
| 680 RECORDING | 786nm REPRODUCTION | | | | | | |
| | REFLECTANCE (%) | 67 | 66 | 70 | 67 | 42 | 70 |
| | ERROR RATE (cps) | 6 | 10 | <5 | <5 | unreproducible | <5 |
| | I3/I top | 0.42 | 0.41 | 0.45 | 0.42 | | 0.43 |
| | 680nm REPRODUCTION | | | | | | |
| | REFLECTANCE (%) | 20 | 18 | 17 | 7 | 9 | 9 |
| | ERROR RATE (cps) | 15 | 15 | 6 | 5650 | 5600 | 5450 |
| | I3/I top | 0.38 | 0.39 | 0.38 | unmeasurable | unmeasurable | unmeasurable |
| | 635nm REPRODUCTION | | | | | | |
| | REFLECTANCE (%) | 22 | 21 | 20 | 8 | 10 | 9 |
| | ERROR RATE (cps) | 7 | 10 | 7 | 5450 | 5600 | 5600 |
| | I3/I top | 0.45 | 0.45 | 0.44 | unmeasurable | unmeasurable | unmeasurable |
| 780 RECORDING | 786nm REPRODUCTION | | | | | | |
| | REFLECTANCE (%) | 66 | 66 | 70 | 67 | 41 | 71 |
| | ERROR RATE (cps) | 6 | 10 | 6 | 6 | unreproducible | <5 |
| | I3/I top | 0.45 | 0.42 | 0.44 | 0.40 | | 0.44 |
| | 680nm REPRODUCTION | | | | | | |
| | REFLECTANCE (%) | 21 | 19 | 18 | 7 | 9 | 9 |
| | ERROR RATE (cps) | 10 | 15 | 8 | 5700 | 5700 | 5700 |
| | I3/I top | 0.39 | 0.40 | 0.40 | unmeasurable | unmeasurable | unmeasurable |
| | 635nm REPRODUCTION | | | | | | |
| | REFLECTANCE (%) | 22 | 22 | 21 | 7 | 11 | 10 |
| | ERROR RATE (cps) | 8 | 10 | 10 | 5800 | 5800 | 5800 |
| | I3/I top | 0.44 | 0.46 | 0.45 | unmeasurable | unmeasurable | unmeasurable |

What is claimed is:

1. An optical recording medium recordable and reproducible with a laser beam having longer wavelength and reproducible with a laser beam having shorter wavelength, which optical recording medium has at least a dye-containing recording layer laminated on a transparent substrate and a reflective layer deposited directly on the recording layer, the medium having a reflectance of 65% or higher, measured through the substrate to a light beam having a selected wavelength ($\lambda 1$) of from 770 to 830 nm and having a reflectance of 15% or higher, measured through the substrate to a light beam having a selected wavelength ($\lambda 2$) of from 630 to 690 nm, the medium thereby being recordable and reproducible with a laser beam having the wavelength of $\lambda 1$ and being reproducible with a laser beam having the wavelength of $\lambda 2$, wherein the following relationships hold:

$n1 \geq 1.8$,
$0.04 \leq k1 \leq 0.15$,
$n2 \geq 1.6$, and
$0.04 \leq k2 \leq 0.4$, wherein n1 is a value of the real part of the complex refractive index of the recording layer to a light beam having a wavelength of $\lambda 1$, k1 is an absolute value of the imaginary part of the complex refractive index of the recording layer to a light beam of $\lambda 1$, n2 is a value of the real part of the complex refractive index of the recording layer to a light beam having a wavelength of $\lambda 2$, and k2 is an absolute value of the imaginary part of the complex refractive index of the recording layer to a light beam of $\lambda 2$.

2. An optical recording medium as claimed in claim 1, wherein the recording layer contains a dye A having an absorption maximum at the wavelength shorter than 630 nm and a dye B having an absorption maximum at the wavelength of from 630 to 900 nm, the content of the dye A being in a range from 80 wt. % to 99.9 wt. % based on dye A+dye B, and the content of the dye B being in a range from 0.1 wt. % to 20 wt. % based on dye A+dye B.

3. An optical recording medium as claimed in claim 2, wherein the dye having the absorption maximum at the wavelength shorter than 630 nm is selected from the group consisting of monocarbocyanine, azo, tetraazaporphyrin, and porphyrin.

4. An optical recording medium as claimed in claim 3, wherein the reflective layer is made of gold.

5. An optical recording medium as claimed in claim 4, wherein the reflectance to the light beam having the wavelength of λ2 is 20% or higher.

6. An optical recording medium as claimed in claim 1, wherein the reflective layer is made of gold.

7. An optical recording medium as claimed in claim 1, wherein the reflectance to the light beam having the wavelength of λ2 is 20% or higher.

8. An optical recording medium recordable and reproducible with a laser beam having longer wavelength and reproducible with a laser beam having shorter wavelength, which optical recording medium has at least a dye-containing recording layer, an interference layer and a reflective layer laminated on a transparent substrate, the medium having a reflectance of 65% or higher, measured through the substrate to a light beam having a selected wavelength (λ1) of from 770 to 830 nm and having a reflectance of 15% or higher, measured through the substrate to a light beam having a selected wavelength (λ2) of from 630 to 690 nm, the medium thereby being recordable and reproducible with a laser beam having the wavelength of λ1 and being reproducible with a laser beam having the wavelength of λ2, wherein the interference layer is provided between the substrate and the recording layer, or between the recording layer and the reflective layer, and the following relationships hold:

n1'≧1.8, 0.04≦k1'≦0.15, n2'≧1.1, and 0.04≦k2'≦0.6, where n1' is a value of the real part of the complex refractive index of the recording layer to a light beam having a wavelength of λ1, k1' is an absolute value of the imaginary part of the complex refractive index of the recording layer to a light beam of λ1, n2' is a value of the real part of the complex refractive index of the recording layer to a light beam having a wavelength of λ2, and k2' is an absolute value of the imaginary part of the complex refractive index of the recording layer to a light beam of λ2, the dye used for the recording layer being a phthalocyanine dye represented by the general formula (1):

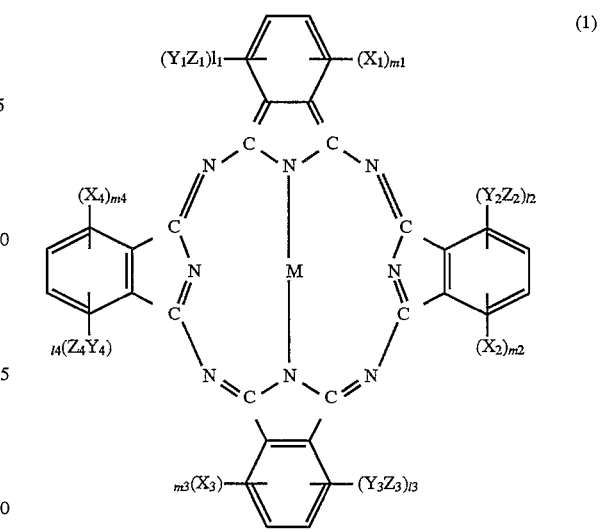

wherein M is two hydrogen atoms, metals, metal oxides, or metal halides; $Y_1$, $Y_2$, $Y_3$ and $Y_4$ each are oxygen or sulfur; $Z_1$, $Z_2$, $Z_3$ and $Z_4$ each are a hydrocarbon group having from 4 to 12 carbon atoms or a group having from 4 to 12 carbon atoms and one or more atoms of at least one element selected from the group consisting of oxygen, nitrogen, sulfur and halogen; $X_1$, $X_2$, $X_3$ and $X_4$ each are a halogen, $l_1$, $l_2$, $l_3$, and $l_4$ each are 1 or 2; and $m_1$, $m_2$, $m_3$, and $m_4$ each are an integer of from 0 to 3.

9. An optical recording medium as claimed in claim 8, wherein the following relationships hold to both light beams of λ1 and λ2:

$100 \leq ni \times di \leq 300$, wherein ni is a refractive index of the interference layer, and di is a film thickness (nm) thereof.

10. An optical recording medium as claimed in claim 8 or 11, wherein the interference layer is made of an inorganic dielectric or a polymer.

11. An optical recording medium as claimed in claim 10, wherein the reflective layer is made of gold.

12. An optical recording medium as claimed in claim 11, wherein the reflectance to the light of λ2 is 20% or higher.

13. An optical recording medium as claimed in claim 8 or 11, wherein the interference layer is made of dyes, the absolute value of the imaginary part of the complex refractive index of the dye being 0.15 or smaller to the light beam of λ1 and being 0.2 or smaller to the light beam of λ2.

14. An optical recording medium as claimed in claim 13, wherein the dye used for the interference layer is an azo dye.

15. An optical recording medium as claimed in claim 13, wherein the dye used for the interference layer is an azo dye or a metal complex of the azo dye represented by the general formula (2):

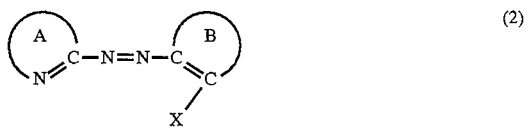

wherein A is a residue forming a heterocyclic ring along with the nitrogen and carbon atoms bonded therewith; B is a residue forming an aromatic ring along with two carbon atoms bonded therewith; and X is a group having an active hydrogen.

16. An optical recording medium as claimed in claim 15, wherein the reflective layer is made of gold.

17. An optical recording medium as claimed in claim 16, wherein the reflectance to the light of $\lambda 2$ is 20% or higher.

18. A method of recording and reproducing information on and from an optical recording medium having at least a dye-containing recording layer and a reflective layer laminated on a transparent substrate in this order, the medium having a reflectance of 65% or higher, measured through the substrate, to a light beam having a selected wavelength ($\lambda 1$) of from 770 to 830 nm and having a reflectance of 15% or higher, measured through the substrate, to a light beam having a selected wavelength ($\lambda 2$) of from 630 to 690 nm, the method comprising the steps of recording and reproducing information on and from the medium with a laser beam having the wavelength of $\lambda 1$ and reproducing the information recorded at the wavelength $\lambda 1$ from the medium with a laser beam having the wavelength of $\lambda 2$.

* * * * *